(12) United States Patent
Momose et al.

(10) Patent No.: US 7,392,706 B2
(45) Date of Patent: Jul. 1, 2008

(54) PRESSURE SENSOR DEVICE

(75) Inventors: Kazuhisa Momose, Kirishima (JP);
Kaoru Matsuo, Kirishima (JP); Shinichi Shimokihara, Kirishima (JP); Hisayuki Inoue, Kirishima (JP); Masashi Kamada, Kirishima (JP); Hiroshi Tachioka, Kirishima (JP); Kouichi Maruta, Kirishima (JP); Hiroshi Oka, Kyoto (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/580,633

(22) PCT Filed: Nov. 26, 2004

(86) PCT No.: PCT/JP2004/017978

§ 371 (c)(1),
(2), (4) Date: May 25, 2006

(87) PCT Pub. No.: WO2005/052533

PCT Pub. Date: Jun. 9, 2005

(65) Prior Publication Data

US 2007/0089525 A1  Apr. 26, 2007

(30) Foreign Application Priority Data

Nov. 27, 2003 (JP) ............................. 2003-397226
Nov. 28, 2003 (JP) ............................. 2003-398797
Dec. 25, 2003 (JP) ............................. 2003-431559

(51) Int. Cl.
*G01L 7/00* (2006.01)

(52) U.S. Cl. ........................................ 73/706

(58) Field of Classification Search ................ 73/706
See application file for complete search history.

(56) References Cited

U.S. PATENT DOCUMENTS

| 4,295,102 | A | | 10/1981 | Schmidt et al. |
| 4,773,269 | A | * | 9/1988 | Knecht et al. .................. 73/706 |
| 5,453,727 | A | * | 9/1995 | Shibasaki et al. ......... 338/32 R |
| 6,329,739 | B1 | | 12/2001 | Sawano |
| 6,754,950 | B2 | | 6/2004 | Furukawa et al. |
| 6,848,316 | B2 | * | 2/2005 | Sittler et al. .................. 73/706 |
| 2002/0078741 | A1 | | 6/2002 | Cantu et al. |
| 2005/0174527 | A1 | * | 8/2005 | Rey-Mermet ............... 349/190 |

FOREIGN PATENT DOCUMENTS

| JP | 59-017127 | 1/1984 |
| JP | 61-082130 | 4/1986 |
| JP | 2003-501733 | 1/2003 |

* cited by examiner

*Primary Examiner*—Andre J Allen
(74) *Attorney, Agent, or Firm*—Hogan & Hartson LLP

(57) ABSTRACT

A sensor substrate 1 having on its lower surface a surface acoustic wave element 2 for detecting pressure is mounted on a supporting substrate 6 through a sealing member 4 surrounding a sensor section 2. A sealing space S is formed by the sensor substrate 1, the supporting substrate 6, and the sealing member 4, and the surface acoustic wave element 2 for detecting pressure is sealed hermetically in the sealing space S. Reliability can be enhanced by protecting the surface acoustic wave element 2 from the external environment.

25 Claims, 22 Drawing Sheets

PRESSURE SENSOR DEVICE

TECHNICAL FIELD

The present invention relates to a pressure sensor device to be used for monitoring an air pressure in a tire, which detects pressure fluctuations of gas or liquid and transmits electrical signals. The portion comprising an element for detecting pressure fluctuations is referred to as "sensor section" in this description, hereinafter.

BACKGROUND ART

Conventionally, as a pressure sensor device for detecting pressure fluctuations of gas or liquid, a type that detects fluctuations of an applied pressure as oscillation frequency changes of a sensor section has been used.

As such a conventional pressure sensor device, as shown in FIG. 40 and FIG. 41, one is known structured so that a surface acoustic wave element 104 and a surface acoustic wave element 107 formed of comb-shaped electrodes are formed as elements of a sensor section on a piezoelectric substrate 101, and a region of the surface acoustic wave element 104 is set thinner than the region of the surface acoustic wave element 107 (for example, refer to Japanese Unexamined Patent Publication No. 61-82130).

In the above-described pressure sensor device, when the surface acoustic wave element 104 formed in the thinned region receives pressure, the surface stress of the piezoelectric substrate 101 changes and the acoustic velocity of the surface acoustic wave changes, and the intervals of the electrodes of the surface acoustic wave element 104 also change. Accordingly, the resonance frequency of the surface acoustic wave element 104 changes, and based on this change in resonance frequency, the pressure can be detected.

The pressure sensor device also has a function to compensate the temperature according to a change in resonance frequency of the surface acoustic wave element 107 formed on the same piezoelectric substrate.

However, in the above-described conventional pressure sensor device, the surface acoustic wave element 104 formed on the sensor substrate 101 is exposed to the surface of the sensor substrate 101, and no member is provided to protect this, so that when this pressure sensor device is used in a manner in that pressure is applied to the sensor substrate 101, the surface acoustic wave element 104 is exposed to the air containing moisture, and this causes oxidation corrosion and deterioration of the surface acoustic wave element 104 made of aluminum or the like. In such a case, it may become impossible to normally work the pressure sensor device.

In addition, in the above-described pressure sensor device, there is another possibility that foreign matter adheres to the surface of the surface acoustic wave element 104 exposed to the air during use. In this case, the electrode fingers of the surface acoustic wave element 104 are electrically short-circuited by the foreign matter and their normal resonance characteristics cannot be obtained, and it becomes impossible to normally work the pressure sensor device.

Furthermore, in the above-described conventional pressure sensor device, an oscillating circuit to be connected to the surface acoustic wave element 104 is disposed so as to be separated from the sensor substrate 101, and therefore, it is difficult to downsize the entire structure of the pressure sensor device, and the wiring that connects the surface acoustic wave element 104 and the oscillating circuit is easily influenced by electromagnetic noise, resulting in erroneous operations and lowering in measuring accuracy.

SUMMARY OF THE INVENTION

An object of the invention is to provide a pressure sensor device whose reliability can be significantly enhanced by excellently protecting the sensor section from the external environment.

Another object of the invention is to provide a pressure sensor device that is excellent in reliability and downsized by protecting the sensor section and the oscillating circuit connected to the sensor section from the external environment.

The pressure sensor device of the invention is constructed of a supporting substrate, a sensor substrate having on its lower surface a sensor section for detecting pressure, and a sealing member that is joined to an upper surface of the supporting substrate and the lower surface of the sensor substrate and forms a sealing space for sealing the sensor section between these substrates.

According to this pressure sensor device, the sensor substrate having on its lower surface a sensor section is mounted on the supporting substrate via a sealing member surrounding the sensor section, and the sensor section is sealed hermetically in the sealing space surrounded by the sensor substrate, the supporting substrate, and the sealing member, so that the sensor section can be insulated from the air containing moisture, and changes in electrical characteristics of the sensor section due to oxidation corrosion and deterioration of the electrodes can be efficiently prevented.

In addition, according to the pressure sensor device of the invention, as described above, the sensor section is insulated from the air, and foreign matter, etc., hardly adheres to the electrodes of the sensor section, so that desired resonance characteristics can be always obtained, and the pressure sensor device can normally function for a long period of time.

Therefore, the reliability of the pressure sensor device can be significantly enhanced.

The sensor section comprises a surface acoustic wave element for detecting pressure.

Furthermore, in the pressure sensor device of the invention, an inert gas fills inside the sealing space. By filling the inside of the sealing space with the inert gas, oxidation corrosion of the sensor section and the like disposed inside the sealing space is more effectively prevented.

Furthermore, in the pressure sensor device of the invention, the sensor substrate is made of a piezoelectric material, and an IDT electrode is formed on a surface of the sensor substrate to form the surface acoustic wave element for detecting pressure.

Furthermore, in the pressure sensor device of the invention, electrode pads to be electrically connected to the sensor section are provided within the sealing space on the lower surface of the sensor substrate, and connecting pads to be electrically connected to the electrode pads via a conductive bonding members are provided within the sealing space on the upper surface of the supporting substrate. This structure has an advantage in that the connecting section between the sensor substrate and the supporting substrate can be more excellently protected from the external environment.

Furthermore, in the pressure sensor device of the invention, the sealing member is made of a conductor material, and is electrically connected to ground terminals provided on the supporting substrate. With this structure, the sealing member can function as a shield member, whereby the sensor section inside the sealing space is hardly influenced by external noise, and can be more stably worked.

Furthermore, in the pressure sensor device of the invention, a concave portion is formed in the upper surface of the sensor substrate above the sensor section. With this structure, the portion where the concave portion is formed and the sensor substrate is thinned is more greatly deformed when it receives the pressure, whereby high sensitivity for detecting pressure is obtained.

Furthermore, in the pressure sensor device of the invention, a surface acoustic wave element for reference for output signal comparison with the surface acoustic wave element for detecting pressure is provided on the lower surface of the sensor substrate positioned outside the region of the concave portion. According to this pressure sensor device, while referring to an output signal from the surface acoustic wave element for reference, the pressure applied to the sensor substrate can be detected based on an output signal from the surface acoustic wave element for detecting pressure.

Furthermore, the pressure sensor device of the invention further includes a first oscillating circuit that oscillates at a predetermined frequency based on a resonance frequency of the surface acoustic wave element for detecting pressure, a second oscillating circuit that oscillates at a predetermined frequency based on a resonance frequency of the surface acoustic wave element for reference, a difference generating circuit that generates and outputs a conversion signal by comparing an oscillation signal from the first oscillating circuit with an oscillation signal from the second oscillating circuit, and a modulation circuit that modulates and outputs the conversion signal from the difference generating circuit and the oscillation signal from the second oscillating circuit to the outside. With this construction, the surface acoustic wave element for detecting pressure and the surface acoustic wave element for reference are formed on the same sensor substrate, so that temperature dependencies are canceled when the difference generating circuit calculates a difference between two oscillation signals based on the resonance frequencies of the elements. This also brings about an advantage in that a pressure conversion signal subjected to temperature correction is obtained.

In addition, to modulate the conversion signal from the difference generating circuit, the oscillation signal from the second oscillating circuit can be used as a carrier signal, so that the number of parts can be reduced and the construction and assembly processes can be simplified.

Furthermore, the pressure sensor device of the invention further includes a first oscillating circuit that oscillates at a predetermined frequency based on delay time of an electrical signal generated by the surface acoustic wave element for detecting pressure, a second oscillating circuit that oscillates at a predetermined frequency based on delay time of an electrical signal generated by the surface acoustic wave element for reference, a difference generating circuit that generates and outputs a conversion signal by comparing an oscillation signal from the first oscillating circuit with an oscillation signal from the second oscillating circuit, and a modulation circuit that modulates and outputs the conversion signal from the difference generating circuit and the oscillation signal from the second oscillating circuit to the outside. With this construction, temperature dependencies of the delay times are canceled when a difference between two oscillation signals generated based on the delay times of the electrical signals generated by the surface acoustic wave elements are calculated. Therefore, similarly to the pressure sensor device described above, an effect is also brought about in that a pressure conversion signal subjected to temperature correction is obtained.

To modulate the conversion signal from the difference generating circuit, the oscillation signal from the second oscillating circuit can be used as a carrier signal, so that the number of parts can be reduced and the construction and assembly processes can be simplified.

Furthermore, in the pressure sensor device of the invention, both the elements are arranged in line by interposing a reflector therebetween, and the reflector is shared by both the surface acoustic wave elements disposed on both sides of the reflector. With this structure, by sharing the reflector by the surface acoustic wave elements disposed on both sides of the reflector, the entire length of the surface acoustic wave elements can be shortened, so that the pressure sensor device can be downsized further.

Furthermore, in the pressure sensor device of the invention, a damping member that blocks transmission of surface acoustic waves or lowers the intensities of the surface acoustic waves is disposed between the elements on the sensor substrate. With this structure, the surface acoustic waves can be effectively attenuated by the damping member, so that reflection of the surface acoustic waves on the end, etc., of the piezoelectric substrate can be prevented.

Furthermore, in the pressure sensor device of the invention, the elements are arranged on the sensor substrate so that the surface acoustic wave propagation directions of the elements become parallel to each other, and both the elements are placed in a direction orthogonal to the surface acoustic wave propagation directions. In this structure, both surface acoustic wave elements are disposed parallel to each other, so that the entire length of the surface acoustic wave elements can be shortened.

Furthermore, in the pressure sensor device of the invention, the resonance frequency of the surface acoustic wave element for detecting pressure and the resonance frequency of the surface acoustic wave element for reference are made different from each other.

Furthermore, the pressure sensor device of the invention comprises the first oscillating circuit, the second oscillating circuit, the difference generating circuit, and the modulation circuit to form an IC chip, and the IC chip and both of the elements are mounted on the same substrate. With this structure, the first oscillating circuit, the second oscillating circuit, the difference generating circuit, and the modulation circuit are integrated on a single IC chip, and by mounting the IC chip and the sensor elements on the same supporting substrate, the pressure sensor device can be effectively reduced in weight and size.

Furthermore, in the pressure sensor device of the invention, the sensor substrate is made of a piezoelectric material, and the sensor section comprises a surface acoustic wave element, the thickness of the sensor substrate immediately below the reflector is almost equal to that of the region immediately below the IDT electrode near the IDT electrode, and is gradually increased with distance from the IDT electrode. The thickness of the piezoelectric substrate immediately below the reflector is gradually increased with distance from the IDT electrode, so that the piezoelectric substrate immediately below the IDT electrode becomes easier to warp according to a pressure change, and the pressure change can be detected well. Therefore, downsizing is possible and high sensor sensitivity can be obtained.

Furthermore, in the pressure sensor device of the invention, the thickness of the sensor substrate immediately below the IDT electrode is allowed to be thinner than the thickness of the sensor substrate immediately below the reflector.

Furthermore, in the pressure sensor device of the invention, an electronic part element including a part of the oscillating circuits is disposed on the supporting substrate. With this structure, the electronic part element including a part of the oscillating circuits is also disposed within the sealing space, so that the electronic part element is also protected from the external environment similarly to the sensor section, and electrical characteristics are maintained excellent. In this case, the wiring that connects the sensor section and the electronic part element can be shortened by arranging these close to each other, so that electromagnetic noise influence can be minimized and failures such as erroneous operations and lowering in measuring accuracy can be effectively prevented. At the same time, by also arranging the electronic part element including a part of the oscillating circuits within the sealing space, it becomes unnecessary to separately secure the space for mounting the electronic part element outside the sealing space, so that the entire structure of the pressure sensor device can be downsized.

Furthermore, in the pressure sensor device of the invention, the electronic part element is mounted on the upper surface of the supporting substrate. By mounting the electronic part element on the upper surface of the supporting substrate, the mounting surface is hardly deformed by pressure fluctuations from the outside, so that it can be very stably mounted.

Furthermore, in the pressure sensor device of the invention, a concave portion is formed on the upper surface of the supporting substrate or the lower surface of the supporting substrate inside the sealing space, and inside the concave portion, the electronic part element including the oscillating circuits is embedded. With this construction, in the case where the electronic part element is embedded in the concave portion formed in the upper surface of the supporting substrate, when mounting the sensor substrate on the supporting substrate, the distance between the sensor substrate and the supporting substrate can be comparatively freely set without considering the thickness of the electronic part element. In the case where the electronic part element is embedded inside the concave portion formed in the lower surface of the supporting substrate, when mounting the supporting substrate on an external substrate, the assembly workability can be improved and the productivity of the pressure sensor device can be maintained at a high level.

Furthermore, in the pressure sensor device of the invention, one end side of one of the sensor substrate and the supporting substrate is extended to form an extended portion while spaced from the other substrate, and the extended portion is provided with an acceleration detecting element for detecting acceleration. With this construction, the acceleration can be detected without separately preparing a substrate for the acceleration detecting element, the number of parts can be reduced, and the pressure sensor device can be reduced in size and weight.

By forming the extended portion on the sensor substrate, the sensor substrate more easily warps than the supporting substrate, so that the acceleration detecting sensitivity can be improved.

Furthermore, the pressure sensor device of the invention includes a transmission circuit that transmits a signal modulated from the conversion signal by the modulation circuit to the outside, an acceleration detecting circuit that outputs a predetermined electrical signal based on an acceleration detection signal from the acceleration detecting element, power supply means that supplies electric power to the transmission circuit, and a power supply control circuit that controls power supply to the transmission circuit from the power supply means, and the power supply control circuit controls power supply from the power supply means based on whether the acceleration exceeds a threshold. With this construction, when the pressure sensor device is installed in a mobile object, only when sensing the acceleration such as the time of traveling, the pressure detection can be enabled. Therefore, wasteful power consumption of the power amplifier can be reduced.

When the acceleration detecting element is formed by a surface acoustic wave element, a pressure detecting section and an acceleration detecting element can be both simultaneously formed in the same manufacturing process, so that the manufacturing process can be shortened and the productivity can be improved.

Furthermore, in the pressure sensor device of the invention, an antenna element to be electrically connected to the electronic part element is mounted on the upper surface of the supporting substrate and/or the lower surface of the sensor substrate. With this construction, a transmission signal outputted from the transmission circuit formed by the electronic part element and the sensor section can be radio transmitted to another receiving equipment, and the receiving equipment can obtain pressure information even at a site apart from the pressure sensor device.

Furthermore, in the pressure sensor device of the invention, the antenna element is mounted outside the sealing space.

Furthermore, in the pressure sensor device of the invention, an antenna pattern to be electrically connected to the electronic part element is deposited on the upper surface of the supporting substrate and/or the lower surface of the sensor substrate. By depositing an antenna pattern to be electrically connected to the electronic part element on the upper surface of the supporting substrate and/or the lower surface of the sensor substrate of the above-described pressure sensor device, the pressure sensor device can be thinned, the number of parts can be reduced, and this contributes to downsizing and cost reduction of the pressure sensor device.

In addition, in the pressure sensor device of the invention, the antenna pattern is mounted outside the sealing space. Thereby, an electrical signal outputted from the transmission circuit can be radio transmitted with almost no attenuation.

Furthermore, in the pressure sensor device of the invention, an antenna pattern to be electrically connected to the electronic part element is deposited on the upper surface of the sensor substrate. Thereby, the transmission circuit and the antenna pattern are arranged close to each other, and the wiring that connects these can be shortened. As a result, influence of transmission loss due to the wiring is reduced, and the electrical signal can be transmitted with almost no attenuation.

Furthermore, in the pressure sensor device of the invention, the antenna pattern is formed in a region except for the region immediately above the surface acoustic wave element for detecting pressure.

Furthermore in the pressure sensor device of the invention, the antenna pattern is meandered. Thereby, the effective length of the antenna pattern can be lengthened, and the gain of the antenna can be increased.

BRIEF DESCRIPTION OF THE DRAWINGS

FIG. 16(*b*) is a sectional view of the same sensor substrate;

FIG. 16(*c*) is a sectional view of a sensor substrate with another structure;

FIG. 17(*b*) is a sectional view of the same pressure sensor device mounted on a substrate;

FIG. 17(*c*) is a plan view of a surface acoustic wave element mounting surface of a sensor substrate used for the same pressure sensor device;

FIG. 17(*d*) is a plan view of a supporting substrate on which the same pressure sensor device is mounted;

BEST MODE FOR CARRYING OUT THE INVENTION

Hereinafter, embodiments of the invention will be described in detail with reference to the accompanying drawings.

First Embodiment

Figure 1:
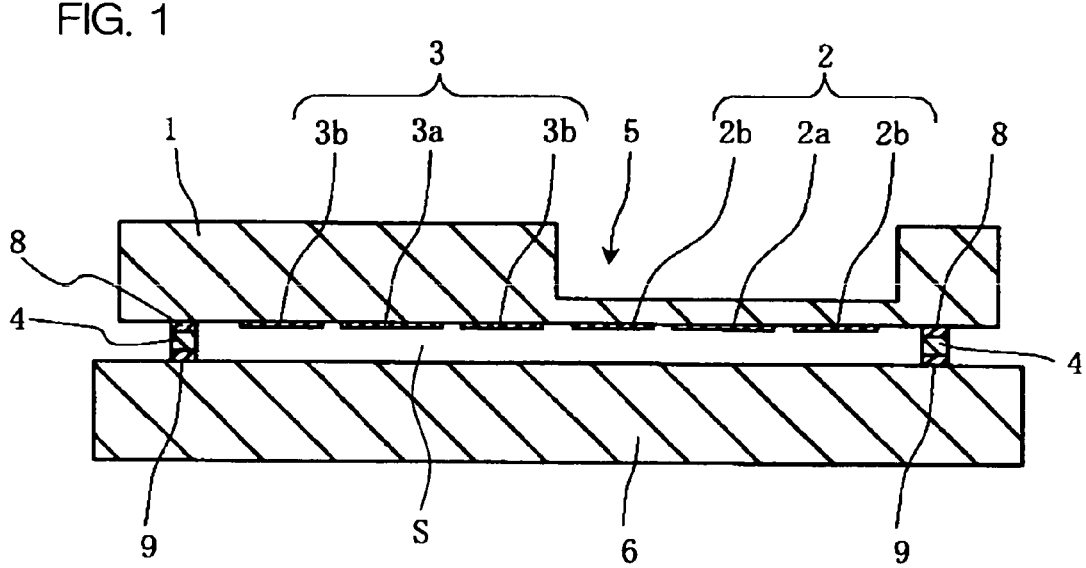
FIG. 1 is a sectional view of a pressure sensor device according to a first embodiment of the invention.
Figure 2:
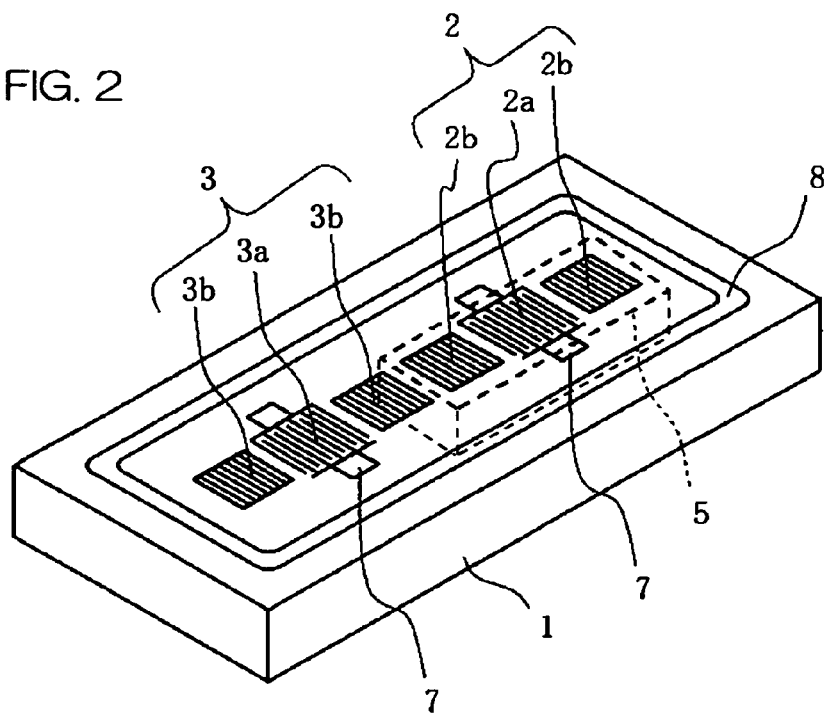
FIG. 2 is a perspective view of a sensor substrate to be used for the same pressure sensor device, on which surface acoustic wave elements are mounted.

FIG. 1 is a sectional view of a pressure sensor device according to an embodiment of the invention, and FIG. 2 is a perspective view of surface acoustic wave elements 2 and 3 formed on the lower surface of a piezoelectric substrate 1 of the pressure sensor device.

The pressure sensor device is mainly constructed of a sensor substrate 1 on which is mounted a surface acoustic wave element 3 for reference and a surface acoustic wave element 2 for detecting pressure, a sealing member 4, and a supporting substrate 6.

A sensor section 11 is formed by the surface acoustic wave element 3 for reference and the surface acoustic wave element 2 for detecting pressure.

The sensor substrate 1 has in its upper surface a concave portion 5, and on the lower surface of the sensor substrate 1, the surface acoustic wave element 2 for detecting pressure is provided in a region immediately below the concave portion 5 (hereinafter, referred to as a thin portion), and on the portion (hereinafter, referred to as a thick portion) other than the thin portion, the surface acoustic wave element 3 for reference is provided.

The sensor substrate 1 is made of piezoelectric single crystal (hereinafter, referred to as "piezoelectric crystal") such as crystal, lithium niobate, or lithium tantalate. The main surface of the sensor substrate 1 is formed by cutting ingot of the piezoelectric crystal at a predetermined cut angle.

The surface acoustic wave element 2 for detecting pressure and the surface acoustic wave element 3 for reference are acoustic surface wave type resonators that resonate at predetermined frequencies.

The surface acoustic wave element 2 for detecting pressure consists of an inter-digital transducer (abbreviated to "IDT") electrode 2a formed on the surface of the sensor substrate 1 and reflectors 2b formed on both sides in a surface acoustic wave propagation direction of the IDT 2a. The IDT 2a and the reflectors 2b are formed by pattern forming to a thickness of approximately 2000 angstroms by using the technique of photolithography or the like by a deposition method such as sputtering of a metal material such as aluminum or gold.

The surface acoustic wave element 3 for reference also consists of, similar to the surface acoustic wave element 2 for detecting pressure, an IDT 3a formed on the surface of the sensor substrate 1 and reflectors 3b formed on both sides in a surface acoustic wave propagation direction of the IDT 3a. The method of manufacturing is the same as that for the surface acoustic wave element 2 for detecting pressure.

A junction 8 is annularly formed on the surface of the sensor substrate 1 so as to surround the surface acoustic wave element 2 for detecting pressure and the surface acoustic wave element 3 for reference. The junction 8 can be formed from the same material by the same method as those for the IDTs 2a and 3a and the reflectors 2b and 3b. The surface thereof is subjected to Ni plating or Au plating. For improvement in adhesion strength, preferably, the film thickness of the junction 8 is formed thick.

The reference numeral 7 of FIG. 2 denotes an electrode pad for supplying exciting power to each of the surface acoustic wave element 2 for detecting pressure and the surface acoustic wave element 3 for reference. This electrode pad 7 is also formed from the same material by the same method as those for the surface acoustic wave element 2 for detecting pressure, the surface acoustic wave element 3 for reference, and the junction 8.

On the other hand, the supporting substrate 6 is required to have mechanical characteristics such as sufficient strength so that it is hardly deformed even by an external pressure, so that a multilayered circuit board using a ceramic material such as glass-ceramic is preferably used.

The supporting substrate 6 is manufactured by laminating and pressure-bonding a plurality of green sheets on which conductor paste that becomes a wiring pattern or via-hole conductor is printed and applied so as to form a predetermined pattern and integrally firing these.

On the upper surface of the supporting substrate 6, connecting pads (not shown) that are electrically connected to the electrode pads 7 formed on the lower surface of the sensor substrate 1 via conductive bonding members such as solder are formed at portions facing the junction 8 formed on the lower surface of the sensor substrate 1.

As the conductive bonding members that connect the electrode pads 7 of the sensor substrate 1 and the connecting pads of the supporting substrate 6, for example, solder, a conductive resin, or the like is used.

To avoid obstruction of deforming of the thin portion in response to an external pressure, it is desirable that the connection between the electrode pad 7 on the lower surface of the sensor substrate 1 and the connecting pads of the upper surface of the supporting substrate 6 are made at the thick portion. If the electrode pads 7 on the lower surface of the sensor substrate and the connecting pads on the upper surface of the supporting substrate 6 are connected at the thin portion, it is desirable that a conductive resin that is easily deformed is used as the conductive bonding members to be used for this connection.

On the upper surface of the supporting substrate 6, a junction 9 that is joined to the junction 8 via a sealing member 4 is provided.

Between the supporting substrate 6 and the sensor substrate 1, the sealing member 4 is interposed so as to surround the aforementioned surface acoustic wave element 3 for reference, surface acoustic wave element 2 for detecting pressure, and electrode pads 7. This sealing member 4 serves as a spacer.

As the sealing member 4, a resin can be used, or a conductive material can be used.

When a resin is used as the sealing member 4, a resin material excellent in sealing performance such as epoxy resin is used. In this case, the junctions 8 and 9 are not necessarily provided on the lower surface of the sensor substrate 1 and the upper surface of the supporting substrate 6. When the sealing member 4 is made of a resin material, by providing the sealing member 4 with conductivity by adding a predetermined amount of a conductive filler such as metal particles thereto and electrically connecting this to a ground terminal on the lower surface of the supporting substrate, the sealing member 4 can be made to serve as a shield member similarly to the embodiment described below, and the surface acoustic wave element forming the sensor section 2 within the sealing space can be made difficult to be influenced by external noise and can be stably operated.

When a conductive material is used as the sealing member 4, solder or AuSn that is a blazing material with a high melting point is used. Particularly, in the process for mounting the pressure sensor device on a mother board or the like, AuSn as a blazing material with a high melting point is preferably used so as to prevent the junction 8 from melting again and changing its characteristics even when heat is applied. The same effect can be obtained by using AuSi or SnAgCu other than AuSn, so that these can be employed.

By forming this sealing member 4 in a frame shape so as to surround the surface acoustic wave element 3 for reference and the surface acoustic wave element 2 for detecting pressure, within the inner side of this sealing member, that is, in detail, within the region surrounded by the sensor substrate 1, the supporting substrate 6, and the sealing member 4 (referred to as a sealing space S), the surface acoustic wave element 3 for reference, the surface acoustic wave element 2 for detecting pressure, and the like can be hermetically sealed. Thereby, oxidation corrosion or the like of the IDT electrode, etc., disposed within the sealing space S can be effectively prevented.

Furthermore, by connecting the sealing member 4 to the ground terminal of the supporting substrate 6, the sealing member 4 is held at the ground potential when the pressure sensor device is used, so that electromagnetic shielding can be improved. By this shielding effect, undesirable noise from the outside can be greatly reduced by the sealing member 4.

Furthermore, by using a conductor material as the sealing member 4, along with the shielding effect, heat conduction between the supporting substrate 6 and the sensor substrate 1 can be improved, so that abnormal temperature rise of the sensor substrate 1 can be lowered.

More preferably, the space S surrounded by the sensor substrate 1, the supporting substrate 6, and the sealing member 4 is filled with an inert gas such as a nitrogen gas or argon gas. Thereby, oxidation corrosion of the IDT electrode and the like can be more effectively prevented.

Herein, the design is made so that the resonance frequencies of the surface acoustic wave element 2 for detecting pressure and the surface acoustic wave element 3 for reference become the same when no pressure is applied.

The surface acoustic wave element 2 for detecting pressure formed on the thin portion lower surface of the sensor substrate 1 deforms when it receives an external pressure, changes its surface acoustic wave propagation speed at the deformed portion, and changes the intervals between electrode fingers of the IDT of the surface acoustic wave element 2 for detecting pressure, and due to these actions, the resonance frequency changes. Therefore, a pressure change can be detected based on a change in resonance frequency of the surface acoustic wave element.

Generally, the surface acoustic wave element has predetermined temperature characteristics, and its resonance frequency drifts according to a temperature change.

Therefore, influence of the drift according to the temperature change must be eliminated, and to eliminate this, the surface acoustic wave element 3 for reference is used. Namely, the portion where the surface acoustic wave element 3 for reference is formed is hardly deformed as described above even when it receives an external pressure because it is thick. Therefore, its resonance frequency changes according to only a temperature change, and by using this, resonance frequency change data of the surface acoustic wave element 2 for detecting pressure is corrected, whereby influence of the temperature change can be almost completely eliminated.

Herein, if the surface acoustic wave element 2 for detecting pressure and the surface acoustic wave element 3 for reference are formed on separate piezoelectric substrates, a resonance frequency change is calculated by considering the temperature difference between these substrates, and by using this change, the influence of the temperature change must be eliminated.

On the other hand, in the pressure sensor device of this embodiment, by forming the surface acoustic wave element 2 for detecting pressure and the surface acoustic wave element 3 for reference on the same sensor substrate 1, the "resonance frequency characteristics according to temperature" are matched between the surface acoustic wave element 3 for reference and the surface acoustic wave element 2 for detecting pressure. Therefore, the resonance frequency changes of the surface acoustic wave elements according to a temperature change become equal to each other, and only by calculating the difference between the resonance frequency of the surface acoustic wave element 2 for detecting pressure and the resonance frequency of the surface acoustic wave element 3 for reference, the influence of the temperature change can be almost completely eliminated. Thus, temperature compensation can be realized by a very simple construction and method.

To realize the temperature compensation, for example, an oscillating circuit that oscillates at a frequency corresponding to the resonance frequency of the surface acoustic wave element 2 for detecting pressure is formed. Thereby, the pressure change of the surface acoustic wave element 2 for detecting pressure can be detected as an oscillation frequency change. In addition, the surface acoustic wave element 3 for reference is also connected to another oscillating circuit that oscillates at a frequency corresponding to the resonance frequency of the surface acoustic wave element 3 for reference. Then, by outputting a signal of a frequency corresponding to the difference between the frequencies of these oscillating circuits, the influence of the temperature change can be easily and almost completely eliminated.

Such oscillating circuits can be mounted on the upper surface or lower surface of the supporting substrate 6 or installed inside the supporting substrate 6 in the form of an IC chip, or can be mounted on a mother board disposed outside the supporting substrate 6.

Figure 3:
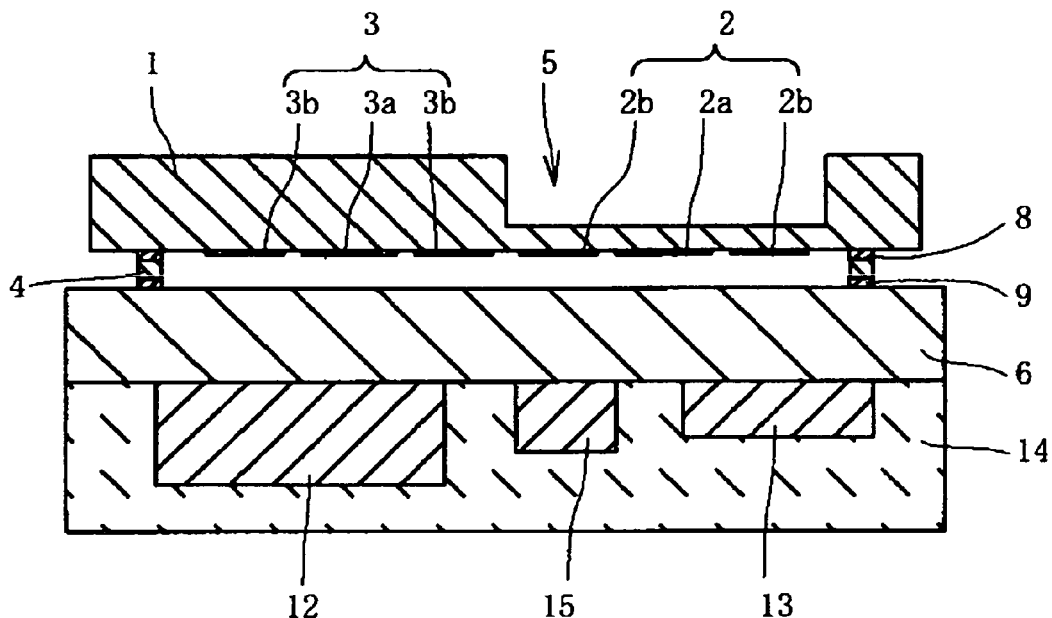
FIG. 3 is a sectional view of the pressure sensor device including an electronic part mounted on the lower surface of a supporting substrate 6.

FIG. 3 is a sectional view of the pressure sensor device, showing an example in which the oscillating circuits and the like are mounted on the lower surface of the supporting substrate 6.

On the lower surface of the supporting substrate 6, a terminal electrode (not shown) is provided, and an IC chip 12 that integrates a first oscillating circuit, a second oscillating circuit, a difference generating circuit, and a modulation circuit described later is mounted, and furthermore, a power amplifier 15 and an antenna 13 are mounted, and a resin 14 is molded so as to cover these.

By thus integrating the first oscillating circuit, the second oscillating circuit, the difference generating circuit, and the modulation circuit on a single IC chip 12, the IC chip 12 and the sensor substrate 1 can be mounted on a common supporting substrate 6. Thereby, the pressure sensor device is reduced in weight and size.

Next, the circuitry of the above-described pressure sensor device will be described with reference to FIG. 4.

The surface acoustic wave element 2 for detecting pressure is connected to the first oscillating circuit 60a that oscillates at a predetermined frequency based on the resonance frequency of the element, and outputs an oscillation signal from the first oscillating circuit 60a to the difference generating circuit 60c.

The surface acoustic wave element 3 for reference is connected to the second oscillating circuit 60b that oscillates at a predetermined frequency based on the resonance frequency of the element, and similarly to the surface acoustic wave element 2 for detecting pressure, outputs an oscillation signal from the second oscillating circuit 60b to the difference generating circuit 60c.

The difference generating circuit 60c includes a mixing element (mixer) for comparing the output signal based on the resonance frequency of the surface acoustic wave element 3 for reference with the output signal based on the resonance frequency of the surface acoustic wave element 2 for detecting pressure. By this difference generating circuit 60c, a conversion signal is generated by calculating the difference between the two oscillation signals based on the resonance frequencies of both surface acoustic wave elements, whereby fluctuation of an external pressure applied from above the sensor substrate 1 is detected.

At this point, as described above, the surface acoustic wave element 2 for detecting pressure and the surface acoustic wave element 3 for reference are formed on the same sensor substrate 1, so that the temperature dependencies of the resonance frequencies are canceled when the difference between two oscillation signals based on the resonance frequencies of the surface acoustic wave elements is calculated. Thereby, influence of a temperature change can be easily and almost completely eliminated, and a net pressure change can be detected.

The conversion signal generated by the difference generating circuit 60c is modulated by the modulation circuit by using the oscillation signal from the second oscillating circuit 60b as a reference signal, and obtained pressure fluctuation data is amplified by the power amplifying circuit and transmitted and outputted to the outside via the antenna.

The oscillation signal based on the resonance frequency of the surface acoustic wave element 3 for reference is thus used as a reference signal for modulating the conversion signal, so that it is not necessary to separately prepare an oscillating circuit that generates the reference signal. Therefore, the number of parts is reduced and the construction and assembly processes can be simplified. Thereby, the productivity of the pressure sensor device can be maintained at a high level, and the pressure sensor device can be reduced in weight and size.

Figure 4:
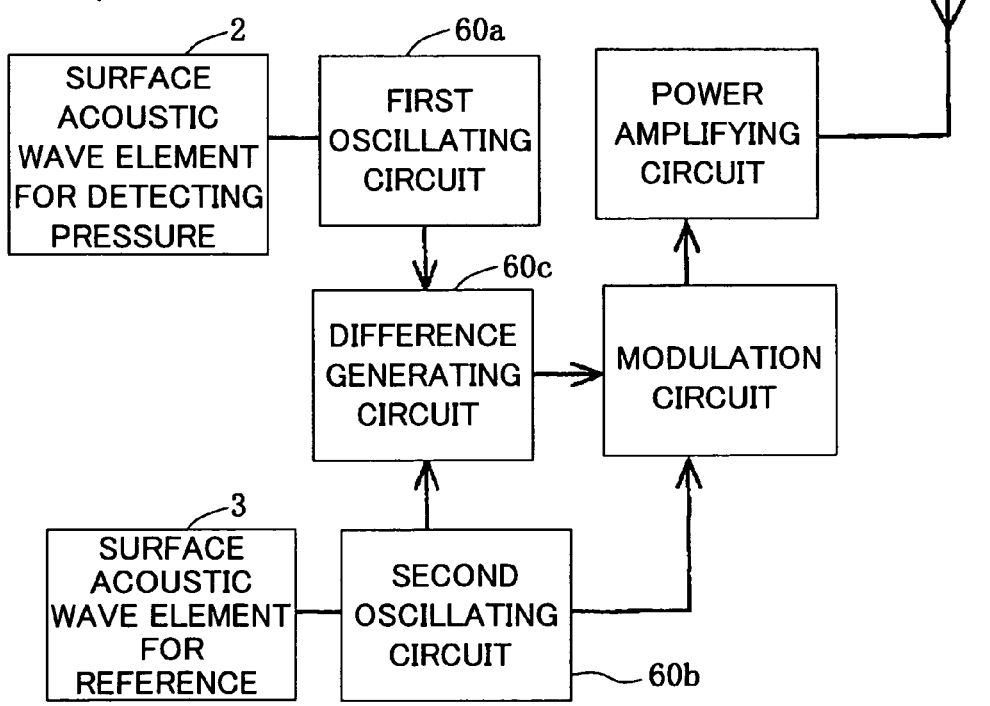
FIG. 4 is a block diagram showing circuitry of the pressure sensor device according to the first embodiment of the invention.

In the circuitry of FIG. 4, the difference generating circuit 60c is used to extract the conversion signal; however, it is also allowed that the first oscillating circuit 60a, the second oscillating circuit 60b, and the difference generating circuit 60c can be formed by one differential oscillating circuit.

Hereinafter, advantages of the pressure sensor device of this embodiment will be described.

According to the pressure sensor device of the embodiment, the thickness of the sensor substrate 1 on which the surface acoustic wave element 2 for detecting pressure is entirely made thinner than the thickness of the portion where the surface acoustic wave element 3 for reference is formed, so that the deformation of the sensor substrate 1 when it receives pressure increases, whereby high sensitivity as the pressure sensor device is obtained.

Furthermore, in the pressure sensor device of this embodiment, it becomes possible to match the temperature characteristics between the surface acoustic wave element 3 for reference and the surface acoustic wave element 2 for detecting pressure, whereby temperature compensation is realized by a very simple construction and method.

Furthermore, the surface acoustic wave element 3 for reference and the surface acoustic wave element 2 for detecting pressure are disposed within the space S sealed by the sensor substrate 1, the supporting substrate 6, and the sealing member 4, and the elements and the electrical connection of the elements can be protected well from the external environment, so that reliability of the pressure sensor device is significantly improved.

In the embodiment of FIG. 1 through FIG. 3, the entire disposing region of the surface acoustic wave element 2 for detecting pressure is positioned at the thin portion, however, instead of this, it is also possible that a part of the disposing region of the surface acoustic wave element 2 for detecting pressure, for example, only the IDT electrode 2a is positioned at the thin portion or the IDT electrode 2a and a part of the reflectors 2b is positioned at the thin portion.

Next, a method for connecting the supporting substrate 6 and the sensor substrate 1 will be described.

First, a first wafer having on its upper surface connecting pads and the junction 9 and a second wafer having on its lower surface the surface acoustic wave element 2 for detecting pressure, the surface acoustic wave element 3 for reference, the junction 8, and the electrode pads 7 are prepared. The first wafer used herein is a collective substrate of supporting substrates 6, and the second wafer is a collective substrate of sensor substrates 1. The thickness of the second wafer is set to 200 to 300 micrometers. On the second wafer 2, thin portions are formed for each of sensor substrates 1 on which individual pressure sensor devices are formed.

The method for forming this thin portion is as follows. The second wafer is affixed to a dicing tape by turning-down the electrode forming surface of the surface acoustic wave element 2 and the like, and in this state, etching or sandblasting is applied so that the thickness of the sensor substrate 1 positioned immediately below the surface acoustic wave element 2 for detecting pressure becomes thinner than other regions.

Next, temporary connection is made between the connecting pads of the first wafer and the electrode pads 7 of the second wafer and between the junctions 9 of the first wafer and the junctions 8 of the second wafer via solder paste. In this embodiment, solder paste containing AuSn particles dispersed in an organic vehicle was used. The solder paste is applied onto the connecting pads and the junctions 9 by a conventionally known screen printing method or the like.

Next, the electrode pads 7 and junctions 8 of the second wafer are made to face the corresponding connecting pads and junctions 9 of the first wafer.

Next, by heating the first wafer and the second wafer, the solder paste is melted.

Thus, the surface acoustic wave element 3 for reference and the surface acoustic wave element 2 for detecting pressure are surrounded by the sealing member 4, and the electrode pads of the first wafer are electrically connected to the electrode pads 7.

Next, only the second wafer is cut by dicing and divided into a plurality of sensor substrates 1, a liquid resin is applied to fill the gaps between the piezoelectric substrates adjacent to each other, and thermally cured. In this embodiment, when applying the liquid resin, the gaps must be effectively filled, so that vacuum printing is preferably used.

Then, the first wafer is cut by dicing together with the above-described resin. Pressure sensor devices divided for each supporting substrate 6 are thus manufactured. The resin serves as a protective member for protecting the end faces of the thin sensor substrates 1.

The pressure sensor device thus constructed is connected to, for example, the above-described transmission circuit 60 and combined with the difference generating circuit, the power amplifier, a power source and an antenna, whereby the pressure sensor device can be used as a tire state monitoring device (TPMS) that is attached to a tire of an automobile and transmits and outputs radio signals according to air pressure changes in the tire.

Next, a pressure sensor device using surface acoustic wave delay lines as surface acoustic wave elements will be described with reference to FIG. 5 and FIG. 6. In this embodiment, only a difference from the embodiment of FIG. 1 and FIG. 2 described above will be described, and for similar components, the same reference numerals are used and overlapping description is omitted.

Figure 5:
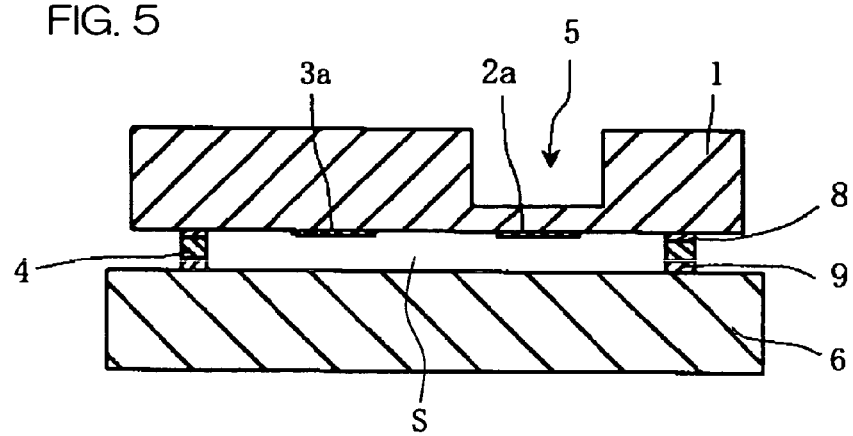
FIG. 5 is a sectional view of the pressure sensor device in which surface acoustic wave elements of a surface acoustic wave delay line type are mounted.
Figure 6:
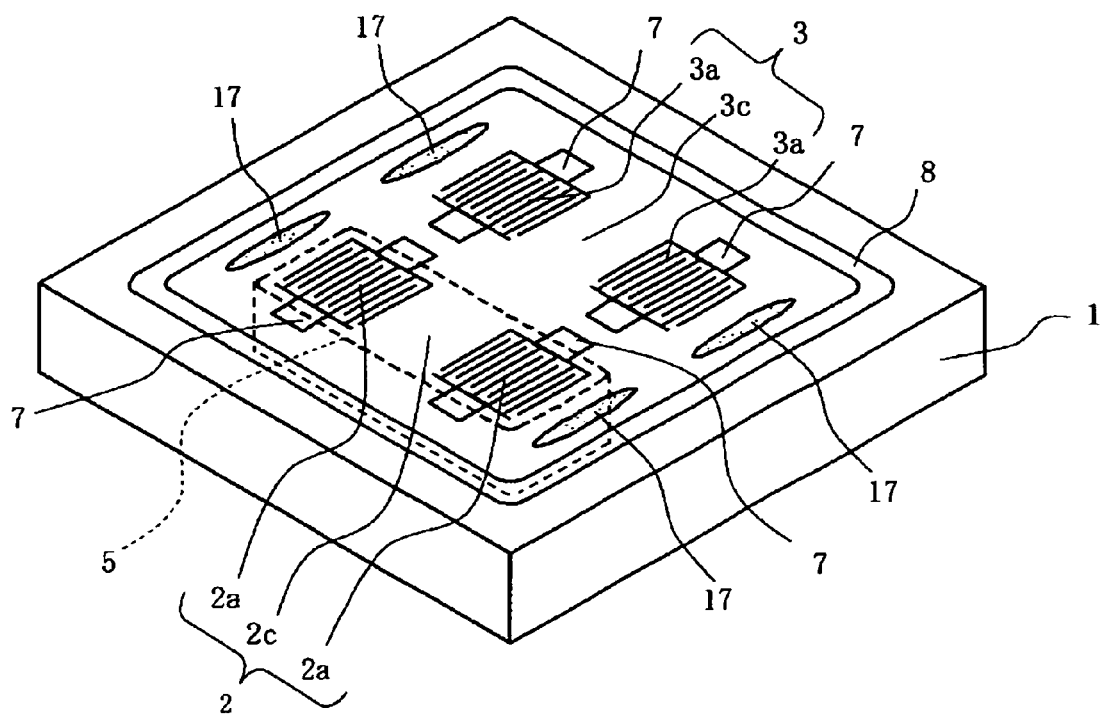
FIG. 6 is a perspective view of a sensor substrate on which surface acoustic wave elements of the surface acoustic wave delay line type are mounted.

FIG. 5 is a sectional view of a pressure sensor device of this embodiment, and FIG. 6 is an external perspective view of a sensor substrate 1 to be used for the pressure sensor device.

The difference of the pressure sensor device of this embodiment from the pressure sensor device of FIG. 1 and FIG. 2 described above is in that the surface acoustic wave element 2 for detecting pressure and the surface acoustic wave element 3 for reference of the sensor substrate 1 are constructed as surface acoustic wave delay lines.

Namely, the surface acoustic wave element 2 for detecting pressure is constructed of a pair of IDT electrodes 2a disposed while spaced from each other on the surface of the sensor substrate 1, and a surface acoustic wave propagation path 2c between the IDT electrodes. Herein, the thin portion of the sensor substrate 1 is provided across the entire region of the surface acoustic wave element 2 for detecting pressure.

Similarly, the surface acoustic wave element 3 for reference is also a surface acoustic wave delay line type. Namely, it is constructed of a pair of IDT electrodes 6a disposed at a predetermined distance on the lower surface of the sensor substrate 1, and a surface acoustic wave propagation path 6c between the IDT electrodes.

On both sides in the surface acoustic wave propagation directions of the surface acoustic wave elements 2 and 3, damping members 17 made of a silicon resin or the like are formed to prevent surface acoustic waves from being attenuated and reflected by the ends of the piezoelectric substrate. The damping members 17 are not necessarily provided if the intensities of the surface acoustic waves to be reflected by the ends of the sensor substrate 1 are at a permissible level.

When an external pressure is applied to the sensor substrate 1 and the thin portion of the sensor substrate 1 deforms, the surface acoustic wave propagation path length changes in the surface acoustic wave element 2 for detecting pressure, and at the same time, the surface acoustic wave propagation speed at the deformed portion changes, and by these actions, the electrical signal delay time changes, so that a pressure change can be detected as in the case of the aforementioned embodiment by detecting the delay time change.

To detect the delay time change, for example, an oscillating circuit that oscillates at a frequency corresponding to the electrical signal delay time caused by the surface acoustic wave delay line of the surface acoustic wave element 2 for detecting pressure is connected. Thereby, the pressure change can be detected as an oscillation frequency change.

Similarly, to the surface acoustic wave element 3 for reference, an oscillating circuit that oscillates at a frequency corresponding to an electrical signal delay time caused by the surface acoustic wave element 3 for reference is connected.

In this case, the surface acoustic wave element 2 for detecting pressure and the surface acoustic wave element 3 for reference are also formed on the same sensor substrate 1, so that the temperature dependencies of the delay times are canceled by calculating the difference between the oscillation signals of the surface acoustic wave elements 2 and 3, whereby temperature correction is made.

Furthermore, in the embodiment of FIG. 5 and FIG. 6 described above, the entire disposing region of the surface acoustic wave element 2 for detecting pressure is positioned at the thin portion, however, instead of this, it is also possible that a part of the disposing region of the surface acoustic wave element 2 for detecting pressure, for example, only the propagation path 2c is positioned at the thin portion, or the propagation path 2c and a part of the IDT electrodes 2a are positioned at the thin portion.

The oscillating circuit is realized as an IC chip, and it can be mounted on the upper surface or the lower surface of the supporting substrate 6 or installed inside the supporting substrate 6, or can be mounted on a mother board out of the supporting substrate 6.

Figure 7:
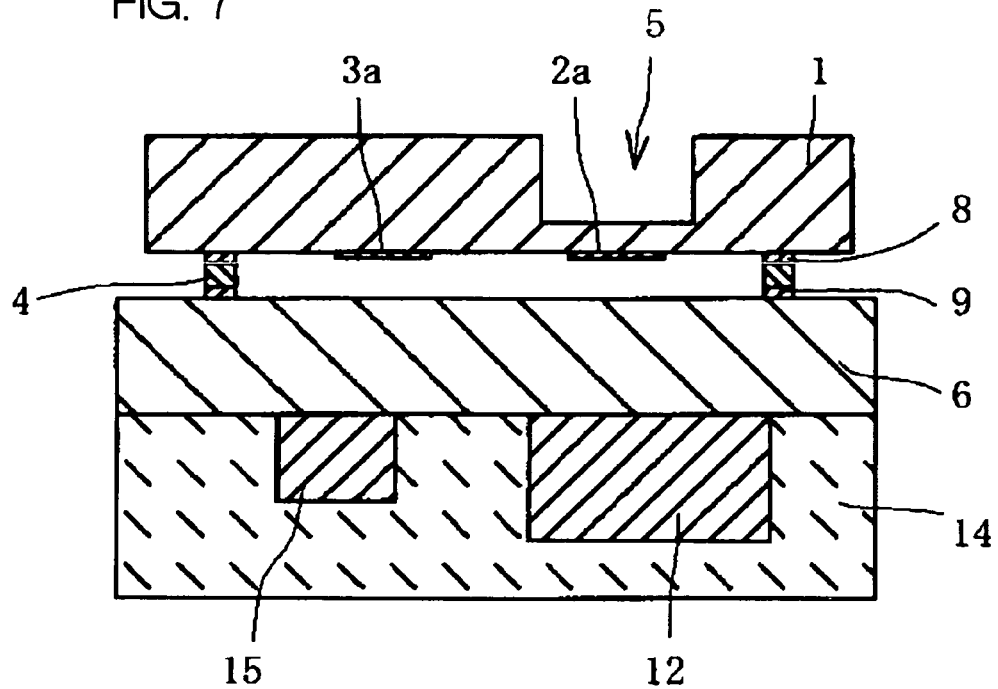
FIG. 7 is a sectional view of the pressure sensor device in which an electronic part is mounted on the lower surface of the supporting substrate 6.

FIG. 7 shows an example in which the oscillating circuit, etc., are mounted on the lower surface of the supporting substrate 6.

On the lower surface of the supporting substrate 6, a terminal electrode (not shown) is provided, and an IC chip 12 that integrates a first oscillating circuit, a second oscillating circuit, a difference generating circuit, and a modulation circuit is mounted, and a power amplifier 15 is further mounted, and a resin 14 is molded so as to cover these.

The functions of the first oscillating circuit, the second oscillating circuit, the difference generating circuit, and the modulation circuit are completely the same as those described above with reference to FIG. 4, and repetition of explanation is omitted herein.

Hereinafter, another construction example of the pressure sensor device of the invention will be described.

Figure 8:
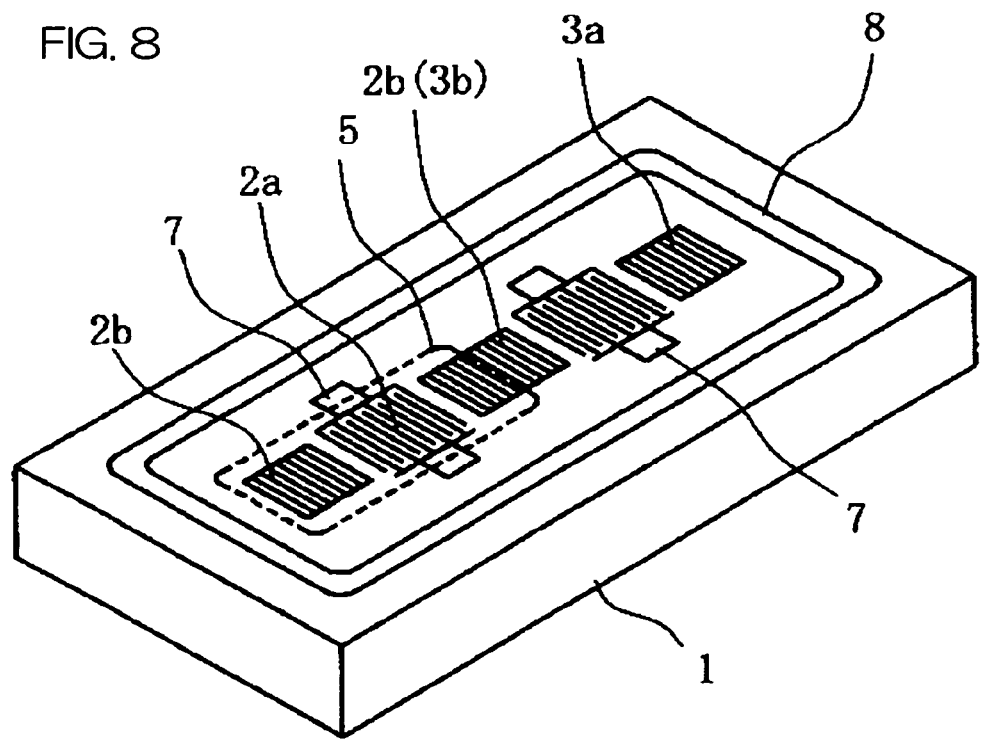
FIG. 8 is a perspective view showing another construction example of the sensor substrate to be used for the pressure sensor device.

FIG. 8 shows a structure in which the surface acoustic wave element 2 for detecting pressure and the surface acoustic wave element 3 for reference are arranged in line on the lower surface of the sensor substrate 1, and the reflector 2b of the surface acoustic wave element 2 for detecting pressure and the reflector 3b of the surface acoustic wave element 3 are formed as a reflector to be shared by the surface acoustic wave elements 2 and 3.

According to this pressure sensor device, the surface acoustic wave element 2 for detecting pressure and the surface acoustic wave element 3 for reference share the reflector 2b (3b) positioned between these elements, so that the area of the sensor substrate 1 including the surface acoustic wave element 2 for detecting pressure and the surface acoustic wave element 3 for reference can be made smaller, and the pressure sensor device can be further reduced in weight. As a result, even when the pressure sensor device is used for monitoring the air pressure in a tire, the centrifugal force generated due to rotation of the tire can be made smaller, so that drop off and breakage of the pressure sensor device inside the tire can be reduced.

FIG. 8 shows an example in which the reflector 2b (3b) to be shared is formed across the inside of the forming region of the concave portion 5 and the outside of the forming region, however, it is also possible that the entirety of the reflector 2b (3b) to be shared is formed within the forming region of the concave portion 5 or outside the forming region of the concave portion 5.

However, to make it easier to deform the region in which the surface acoustic wave element 2 for detecting pressure is formed when an external pressure is applied to the pressure sensor device and increase the sensitivity of the pressure sensor device, it is preferable that the entirety of the reflector 2b (3b) to be shared is formed within the forming region of the concave portion 5.

Figure 9:
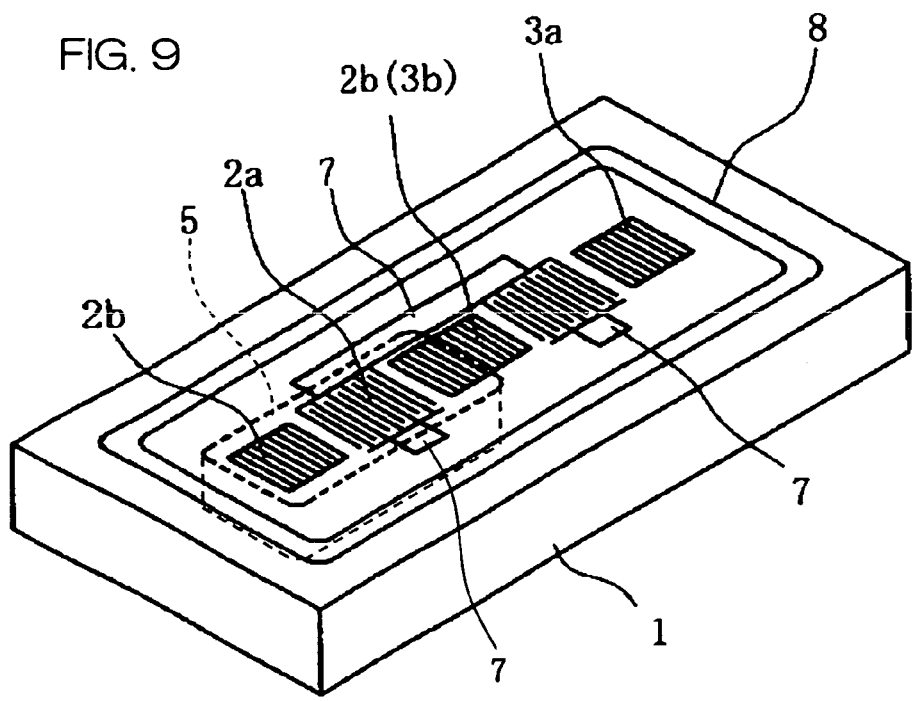
FIG. 9 is a perspective view showing still another construction example of the sensor substrate to be used for the pressure sensor device.

In addition, as shown in the perspective view of FIG. 9, it is also possible that an electrode pad 7 can be shared by the IDT electrode 2a of the surface acoustic wave element 2 for detecting pressure and the IDT electrode 6a of the surface acoustic wave element 3 for reference. In this case, the number of electrode pads becomes one less, so that the processes can be simplified.

Figure 10:
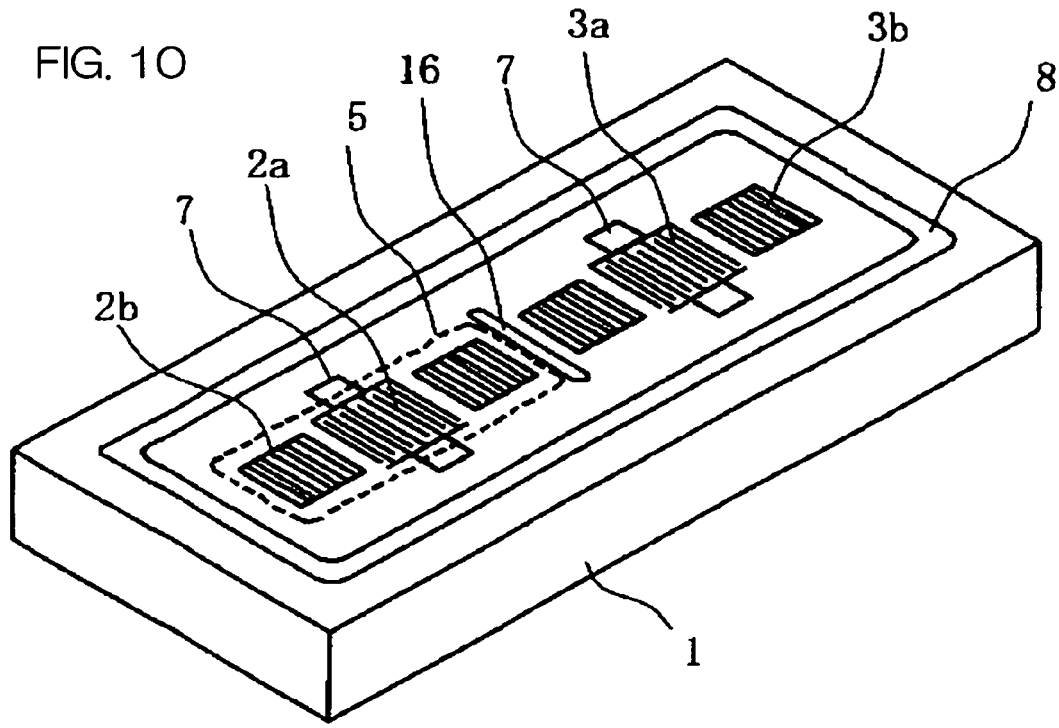
FIG. 10 is a perspective view showing still another construction example of the sensor substrate to be used for the pressure sensor device.

FIG. 10 shows a structure in which a damping member 16 that blocks transmission of surface acoustic waves or lowers the intensities of surface acoustic waves is disposed between the surface acoustic wave element 2 for detecting pressure and the surface acoustic wave element 3 for reference on the sensor substrate 1.

According to this pressure sensor device, the damping member 16 that blocks transmission of surface acoustic waves or lowers the intensities of surface acoustic waves is disposed between the surface acoustic wave element 2 for detecting pressure and the surface acoustic wave element 3 for reference on the surface of the sensor substrate 1, and therefore, even when the elements are disposed close to each other so that the carrier waves of the surface acoustic waves advance on the same line for downsizing the pressure sensor device, carrier waves that could not be reflected by the reflectors and leak are absorbed well by the damping member 16 positioned between the surface acoustic wave element 2 for detecting pressure and the surface acoustic wave element 3 for reference. Therefore, the carrier waves which leak and the carrier waves of the surface acoustic wave element 3 for reference or the surface acoustic wave element 2 for detecting pressure close to the carrier waves which leak rarely interfere with each other, and as a result, pressure measurement can be accurately performed.

As the damping member 16, any material such as a resin or a metal can be used as long as it damps carrier waves, and preferably, a material with elasticity represented by silicone rubber is used. The damping member is disposed by printing on the surface of the sensor substrate 1 by using a conventionally known screen printing method when the damping member is made of silicone rubber.

The damping member 16 is continuously disposed between the adjacent reflectors 2b and 3b in a region at least from a portion between one-side ends to a portion between the other side ends, whereby the effect of damping carrier waves which leak can be obtained. The width of the damping member 16 is appropriately determined according to the distance between the adjacent reflectors 2b and 3b, and is normally several micrometers through several tens of millimeters. By forming the damping member 16 in contact with the supporting substrate 6, an effect of greater damping of the carrier waves which leak can be obtained.

Figure 11A:
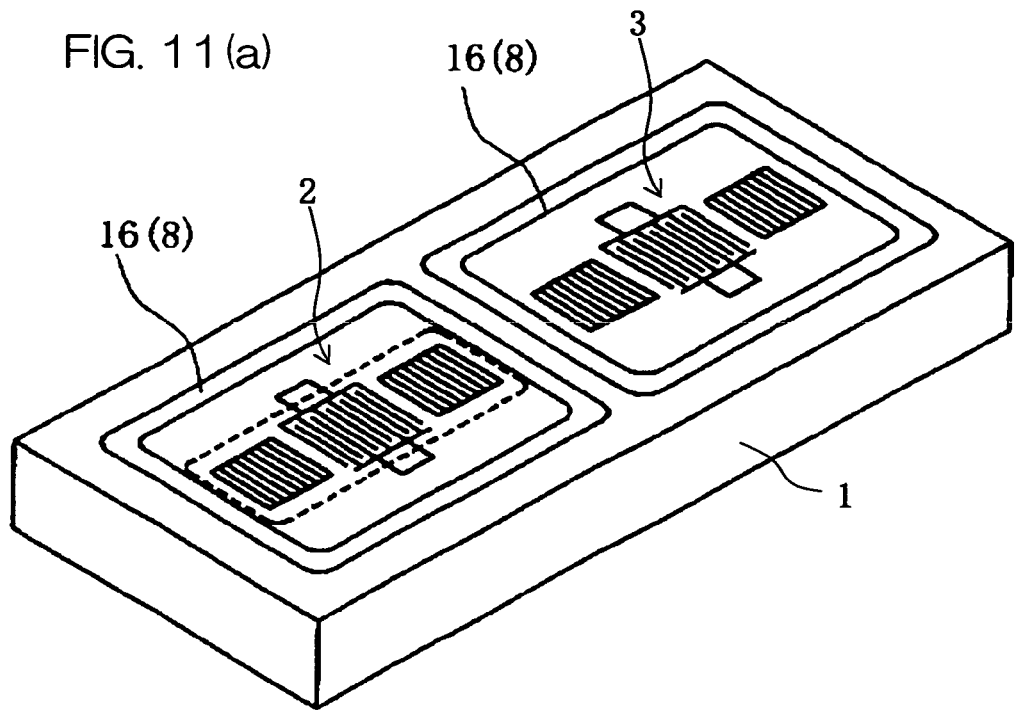
FIG. 11 is a perspective view showing still another construction example of the sensor substrate to be used for the pressure sensor device.
Figure 11B:
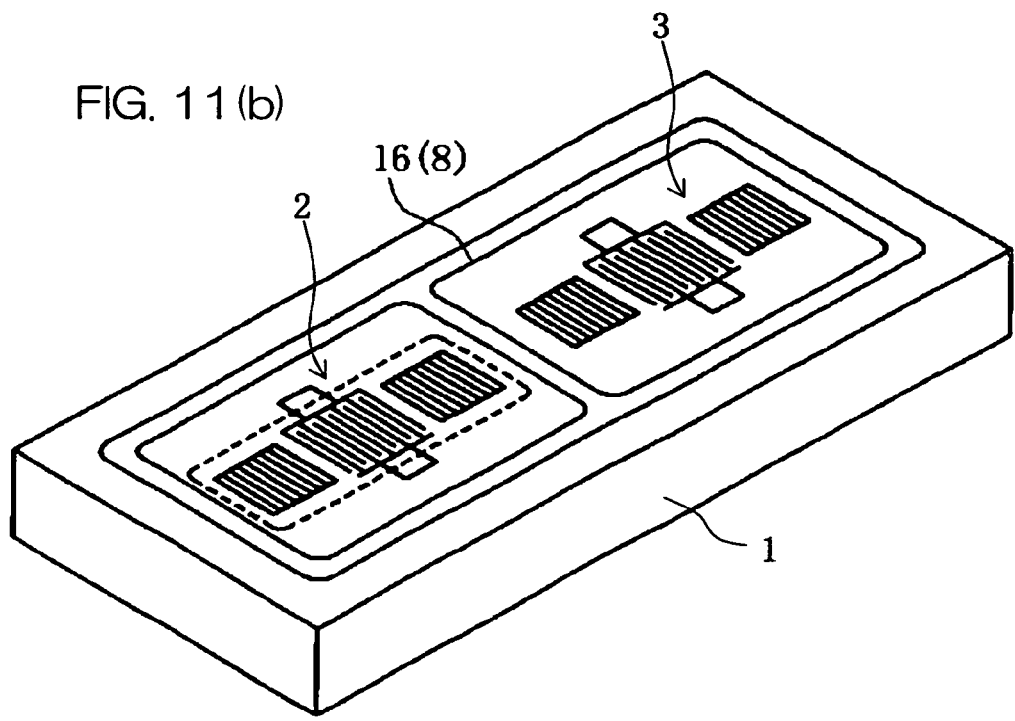

It is also possible that the damping member 16 is formed so as to surround the surface acoustic wave element 2 for detecting pressure and the surface acoustic wave element 3 for reference, respectively, as shown in FIG. 11(*a*). Furthermore, it is also possible that, as shown in FIG. 11(*b*), the surface acoustic wave element 2 for detecting pressure and the surface acoustic wave element 3 for reference are surrounded by one large damping member 16, and at the same time, the damping member 16 is also disposed between the surface acoustic wave element 2 for detecting pressure and the surface acoustic wave element 3 for reference. In this case, by making the damping member 16 from solder or a conductor material such as a conductive resin, it can also serve as the function of the junction 8, and the processes are not increased.

Figure 12:
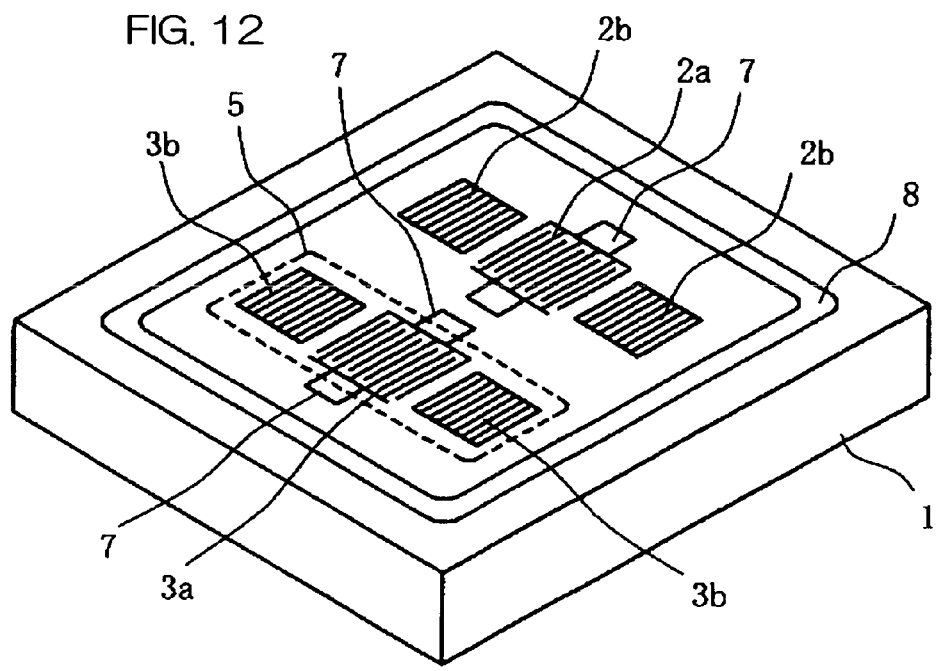
FIG. 12 is a perspective view showing still another construction example of the sensor substrate to be used for the pressure sensor device.

As shown in FIG. 12, a construction can also be employed in which the surface acoustic wave element 2 for detecting pressure and the surface acoustic wave element 3 for reference on the sensor substrate 1 are disposed parallel to each other. Namely, the surface acoustic wave element 2 for detecting pressure and the surface acoustic wave element 3 for reference are disposed parallel to each other so that the propagation directions of surface acoustic waves of the elements 2 and 3 become parallel to each other.

According to the pressure sensor device of the invention, the surface acoustic wave element 2 for detecting pressure and the surface acoustic wave element 3 for reference on the sensor substrate 1 are disposed parallel to each other, so that even when the surface acoustic wave element 2 for detecting pressure and the surface acoustic wave element 3 for reference are formed on the same substrate for downsizing, the surface acoustic waves thereof do not advance on the same line, so that the surface acoustic waves generated from the surface acoustic wave element 2 for detecting pressure and the surface acoustic waves generated from the surface acoustic wave element 3 for reference do not interfere with each other, and as a result, pressure measurement can be accurately performed.

From the point of view of prevention of interference between surface acoustic waves, the surface acoustic wave element 2 for detecting pressure and the surface acoustic wave element 3 for reference can be disposed while their positions in the advancing directions of surface acoustic waves are misaligned with each other, however, from the point of view of downsizing, it is preferable that the elements are disposed widthwise parallel to each other.

Figure 13:
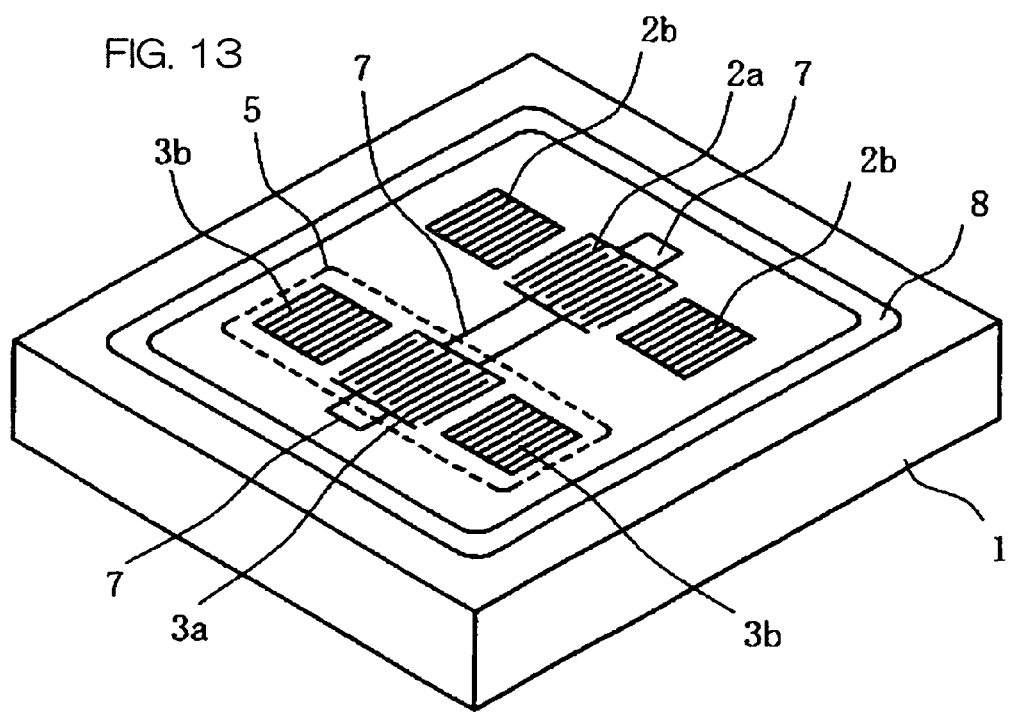
FIG. 13 is a perspective view showing still another construction example of the sensor substrate to be used for the pressure sensor device.

In addition, as shown in FIG. 13, when the surface acoustic wave element 2 for detecting pressure and the surface acoustic wave element 3 for reference are disposed adjacent and parallel to each other, the electrode pad 7 is shared by the elements, whereby more downsizing is possible.

As still another example, it is also possible that the surface acoustic wave element 2 for detecting pressure and the surface acoustic wave element 3 for reference on the sensor substrate 1 are formed so that their resonance frequencies are different from each other.

In this case, the resonance frequency of the surface acoustic wave element 2 for detecting pressure and the resonance frequency of the surface acoustic wave element 3 for reference on the sensor substrate 1 are made different from each other, so that even when the surface acoustic wave element 2 for detecting pressure and the surface acoustic wave element 3 for reference are formed close to each other on the same substrate for downsizing, the carrier waves of the surface acoustic wave element 3 for reference and the carrier waves of the surface acoustic wave element 2 for detecting pressure do not interfere with each other, so that pressure measurement can be accurately performed.

In the pressure sensor device of the invention, when the resonance frequency of the surface acoustic wave element 2 for detecting pressure is defined as fr2, its antiresonance frequency is defined as fa2, the resonance frequency of the surface acoustic wave element 3 for reference is defined as fr3, and its antiresonance frequency is defined as fa3, these frequencies can be set so as to satisfy the following:

$$fa2 < fr3 \quad (1)$$

or $$fa3 < fr2 \quad (2).$$

Figure 14:
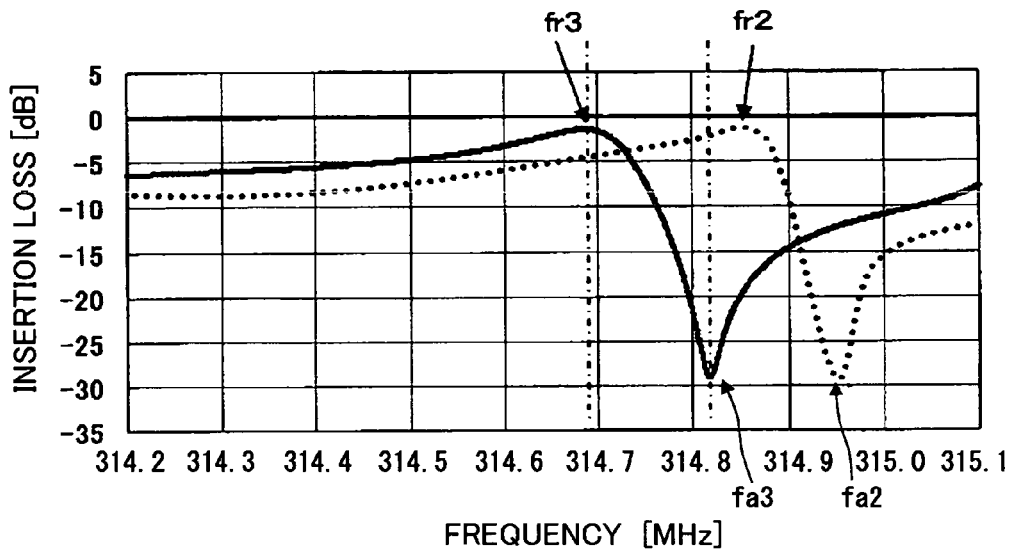
FIG. 14 is a graph showing an example of resonance characteristics of a surface acoustic wave element for detecting pressure and a surface acoustic wave element for reference.

FIG. 14 shows an example of the resonance characteristics of the surface acoustic wave element 2 for detecting pressure by a dotted line, and an example of the resonance characteristics of the surface acoustic wave element 3 for reference by a solid line provided that the horizontal axis shows frequency (unit: MHz) and the vertical axis shows insertion loss (unit: dB).

The piezoelectric materials of the surface acoustic wave element 2 for detecting pressure and the surface acoustic wave element 3 for reference have the resonance frequencies (fr) at which the insertion loss becomes minimum, and antiresonance frequencies (fa) at which the insertion loss becomes maximum as shown in the graph of FIG. 14, and satisfy the relationship of fr<fa. Therefore, the formulas (1) and (2) mean setting of the resonance frequencies and antiresonance frequencies so that the frequency band (fr2 to fa2) from the resonance frequency fr2 to the antiresonance frequency fa2 of the surface acoustic wave element 2 for detecting pressure and the frequency band (fr3 to fa3) from the resonance frequency fr3 to the antiresonance frequency fa3 of the surface acoustic wave element 3 do not overlap each other.

When resonance frequency fr2 and antiresonance frequency fa2 of the surface acoustic wave element 2 for detecting pressure and the resonance frequency fr3 and antiresonance frequency fa3 of the surface acoustic wave element 3 for reference do not satisfy the formula (1) or the formula (2), that is, when the frequency band (fr2 to fa2) from the resonance frequency fr2 to the antiresonance frequency fa2 of the surface acoustic wave element 2 for detecting pressure and the frequency band (fr3 to fa3) from the resonance frequency fr3 to the antiresonance frequency fa3 of the surface acoustic wave element 3 for reference overlap each other, leak surface acoustic waves of the surface acoustic wave element 2 for detecting pressure appear as spurious in the frequency band of fr2 to fa2, or leak surface acoustic waves of the surface acoustic wave element 3 for reference appear as spurious in the frequency band from fr2 to fa2, and the resonance characteristics of the surface acoustic wave element 2 for detecting pressure and the surface acoustic wave element 3 for reference are disturbed and accurate pressure measurement becomes difficult.

Therefore, it is preferable that, when the resonance frequency of the surface acoustic wave element 2 for detecting pressure is defined as fr2, its antiresonance frequency is defined as fa2, the resonance frequency of the surface acoustic wave element 3 for reference is defined as fr3, and its antiresonance frequency is defined as fa3, the frequencies are set so as to satisfy fa2<fr3 or fa3<fr2.

FIG. 14 shows resonance characteristics of the surface acoustic wave element 3 for reference when its resonance frequency (fr3) is 314.68 MHz and its antiresonance frequency (fa3) is 314.82 MHz. In this case, the resonance frequency fr2 of the surface acoustic wave element 2 for detecting pressure is set to be higher than the antiresonance frequency (fa3=314.82 MHz) of the surface acoustic wave element 3 for reference. For example, as a detailed element design of the surface acoustic wave element 2 for detecting pressure and the surface acoustic wave element 3 for reference when a crystal substrate (ST cut crystal, surface acoustic wave velocity V=3110 m/s, normalized film thickness (H/λ)=2%, H: electrode film thickness (micrometer) of metal material, λ: wavelength (micrometer)) is used as the sensor substrate 1, the wavelength λ2 of the surface acoustic wave element 2 for detecting pressure becomes less than 9.879 micrometers and the electrode finger width P2 of the IDT electrode becomes less than 2.470 micrometers provided that the resonance frequency fr2 of the surface acoustic wave element 2 for detecting pressure is more than 314.82 MHz. In addition, when the resonance frequency fr3 of the surface acoustic wave element 3 for reference is equal to 314.68 MHz, the wavelength λ3 of the surface acoustic wave element 3 for reference becomes equal to 9.883 micrometers and the electrode finger width P2 of the IDT electrode becomes equal to 2.471 micrometers. In this example, the case of fa3<fr2 is described, and similarly, in the case of fa2<fr3, the frequencies are set so that the frequency band (fr2 to fa2) from the resonance frequency fr2 to the antiresonance frequency fa2 of the surface acoustic wave element 2 for detecting pressure and the frequency band (fr3 to fa3) from the resonance frequency fr3 to the antiresonance frequency fa3 of the surface acoustic wave element 3 for reference do not overlap each other.

Figure 15:
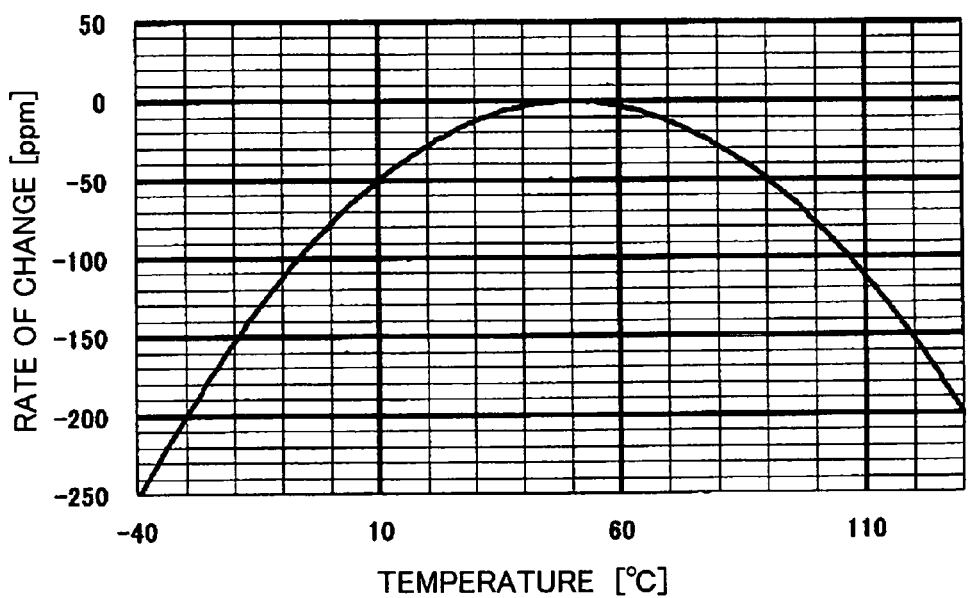
FIG. 15 is a graph showing frequency temperature characteristics of the surface acoustic wave elements when a crystal substrate is used as the sensor substrate 1.

FIG. 15 is a graph showing frequency temperature characteristics of the surface acoustic wave elements when using a crystal substrate as the sensor substrate 1. In FIG. 15, the horizontal axis shows temperature (unit: degree C.), and the vertical axis shows rate of change in frequency (unit: ppm).

When using a single crystal piezoelectric material whose frequency temperature characteristics are expressed by a quadratic curve represented by a crystal substrate as shown in this graph, if the resonance frequency (fr) difference between the surface acoustic wave element 2 for detecting pressure and the surface acoustic wave element 3 for reference becomes great, the difference between the turnover temperature of the frequency temperature characteristics of the surface acoustic wave element 2 for detecting pressure and the turnover temperature of the frequency temperature characteristics of the surface acoustic wave element 3 for reference becomes great, and accurate pressure measurement becomes impossible, so that this is undesirable.

Generally, in a single crystal piezoelectric material having a turnover temperature, the turnover temperature is determined based on the relationship between a cut angle of the single crystal piezoelectric material and a normalized film thickness (H/λ) of the electrode film thickness of the metal material for forming the IDT electrode and the like. Herein, the reference symbol H denotes an electrode film thickness (micrometer) of the metal material and λ denotes a wavelength (micrometer).

However, as in the case of the invention, when resonance frequencies of the surface acoustic wave element 2 for detecting pressure and the surface acoustic wave element 3 for reference are made different from each other, λ becomes different between the surface acoustic wave element 2 for detecting pressure and the surface acoustic wave element 3 for reference. Therefore, when the electrode film thickness of the metal material is the same, the normalized film thickness (H/λ) is different and the turnover temperature of the frequency temperature characteristic is also different. From this relationship, when the difference in resonance frequency between the surface acoustic wave element 2 for detecting pressure and the surface acoustic wave element 3 for reference increases, the normalized film thickness difference between these also increases, and as a result, the turnover temperature difference of the frequency temperature characteristics of the elements also increases.

Therefore, when forming the surface acoustic wave element 2 for detecting pressure and the surface acoustic wave element 3 for reference in the pressure sensor device of the invention, the resonance frequencies and antiresonance frequencies of these are set so that the frequency band (fr2 to fa2) from the resonance frequency fr2 to the antiresonance frequency fa2 of the surface acoustic wave element 2 for detecting pressure and the frequency band (fr3 to fa3) from the resonance frequency fr3 to the antiresonance frequency fa3 of the surface acoustic wave element 3 for reference do not overlap, and in the case where a single crystal piezoelectric material whose frequency temperature characteristics are expressed by a quadratic curve like a crystal substrate is used, the surface acoustic wave element 2 for detecting pressure and the surface acoustic wave element 3 for reference are formed so that their turnover temperature difference does not become great, for example, becomes within ±5 degrees C.

Herein, if the turnover temperature difference is more than ±5 degrees C., frequency temperature changes of the surface acoustic wave element 2 for detecting pressure and the surface acoustic wave element 3 for reference become measuring errors when measuring a pressure, so that this is undesirable. Therefore, if the turnover temperature difference between these elements exceeds ±5 degrees C., the electrode film thickness H of the metal material is etched by using a metal film etching technique such as plasma etching so that the surface acoustic wave element 3 for reference and the surface acoustic wave element 2 for detecting pressure have the same normalized film thickness (H/λ).

In this embodiment, the surface acoustic wave element 2 for detecting pressure is formed on the lower surface side of the sensor substrate 1, however, instead of this, it is also allowed that the surface acoustic wave element 2 for detecting pressure is formed on the upper surface side of the sensor substrate 1.

Second Embodiment

Hereinafter, a pressure sensor device according to a second embodiment of the invention will be described in detail with reference to the accompanying drawings.

Figure 16A:
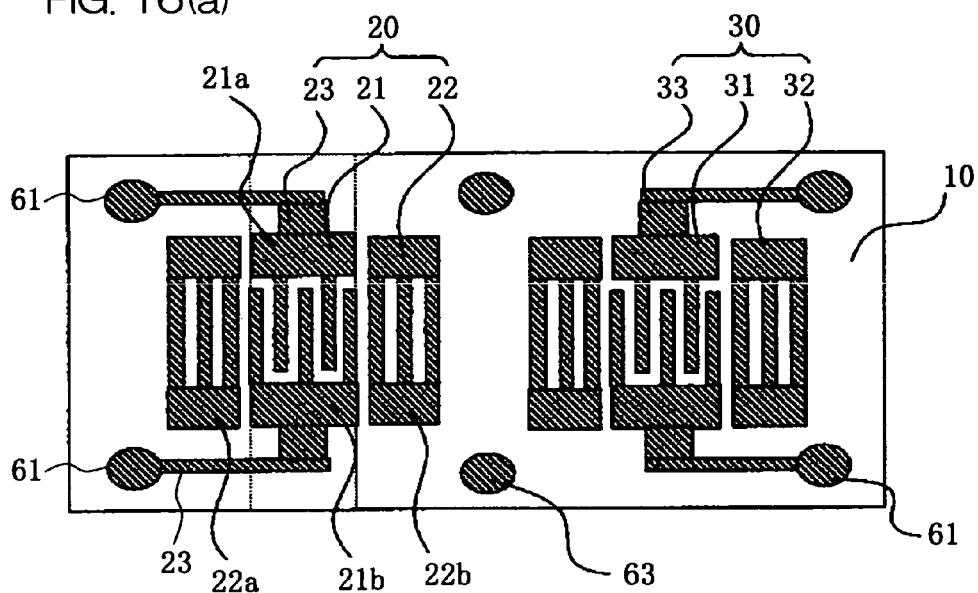
FIG. 16(*a*) is a plan view of a sensor substrate of a pressure sensor device according to a second embodiment of the invention.
Figure 16B:
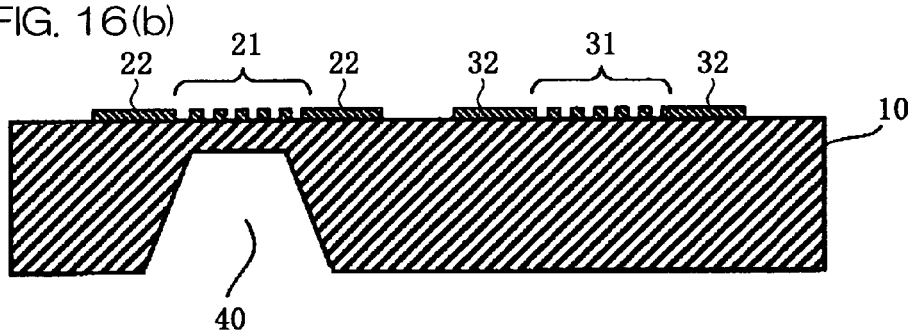
Figure 16C:
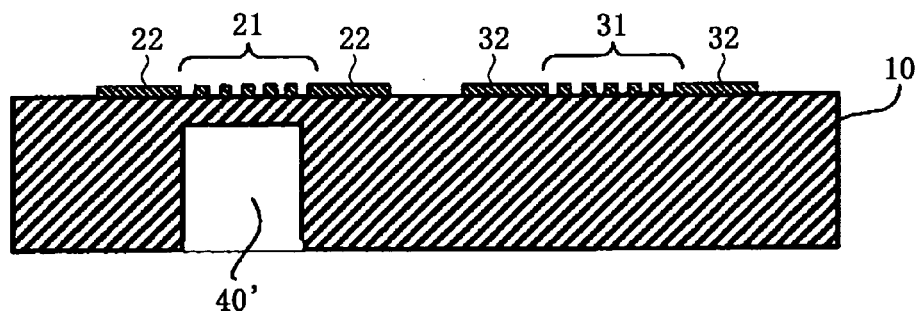

FIG. 16(a) through FIG. 16(c) are drawings showing a pressure sensor device according to an embodiment of the invention, and FIG. 16(a) is a top view and FIG. 16(b) and FIG. 16(c) are sectional views.

The pressure sensor device shown in these drawings includes a sensor substrate 10, and a surface acoustic wave element 20 for detecting pressure including an IDT electrode 21 and reflectors 22 formed on the upper surface of the sensor substrate.

The sensor substrate 10 is made of, for example, a single piezoelectric crystal such as crystal, lithium tantalate single crystal, lithium niobate single crystal, lithium tetraborate single crystal, or a piezoelectric ceramics such as lead titanate or lead zirconate, and when a voltage is applied to the sensor substrate 10 via the surface acoustic wave element 20 for detecting pressure, the sensor substrate generates predetermined surface acoustic waves on one main surface.

The surface acoustic wave element 20 for detecting pressure is constructed of the IDT electrode 21 that excites surface acoustic waves, reflectors 22 disposed on both sides of the IDT electrode 21 along the propagation direction of the surface acoustic wave, pad electrodes 23 for external connection to be electrically connected to the IDT electrode 21, and so on. The IDT electrode 21, the reflectors 22, and the pad electrodes 23 are made of a metal material such as aluminum or an alloy mainly containing aluminum.

The IDT electrode 21 is constructed of band-shaped common electrodes disposed parallel to each other, and a pair of comb-shaped electrodes 21a and 21b including a plurality of electrode fingers extending in directions orthogonal to the common electrodes.

When predetermined power is externally applied, the IDT electrode 21 generates predetermined surface acoustic waves corresponding to the arranging pitches of the electrode fingers on the upper surface of the sensor substrate 10, in detail, surface acoustic waves that set the arranging pitches of the electrode fingers to ½ wavelength.

On the other hand, the reflectors 22 shut the energy of the surface acoustic waves generated within the forming region of the IDT electrode 21 between the pair of reflectors 22a and 22b to effectively generate standing waves.

To the electrode pads formed to be electrically connected to the IDT electrodes 21, metal thin wires and bumps that make electrical connection to the exterior are joined to perform a function of externally applying a predetermined external voltage to the IDT electrode 21.

The surface acoustic wave element 30 for reference has the same construction as that of the surface acoustic wave element 20 for detecting pressure described above.

The surface acoustic wave element 30 for reference is disposed at a distance from the surface acoustic wave element 20 for detecting pressure so that its resonance frequency does not fluctuate before and after pressure fluctuation. The surface acoustic wave element 30 for reference includes an IDT electrode 31 and reflectors 32 formed on the sensor substrate 10 so that its surface acoustic wave propagation direction becomes the same as that of the surface acoustic wave element 20 for detecting pressure.

In the pressure sensor device of this embodiment, a groove-shaped concave portion 40 or 40' is formed in the lower surface of the sensor substrate 10 positioned immediately below the IDT electrode 21, and the thickness at this portion becomes thinner than other region.

Particularly, at the concave portion 40 of FIG. 16(b), the thickness of the sensor substrate 10 positioned immediately below the reflectors 22 is gradually increased with distance from the IDT electrode 21.

At the concave portion 40' of FIG. 16(c), the thickness of the sensor substrate 10 changes stepwise immediately below the IDT electrode 21 and the reflectors 22.

Such a pressure sensor device is manufactured by the following method.

First, a motherboard (wafer) of piezoelectric single crystal is prepared, and an electrode film is formed on the wafer by vapor deposition or sputtering. Next, a resist is spin-coated on this electrode film and exposed and developed by using a stepper apparatus or the like, and then etched by using an RIE apparatus to form an electrode pattern of the IDTs and reflectors on the wafer. Thereby, a number of surface acoustic wave elements 20 for detecting pressure and surface acoustic wave elements 30 for reference are formed lengthwise and widthwise on the surface of the wafer.

Next, the wafer is affixed to a dicing tape by turning the electrode forming surface of the surface acoustic wave elements down, and in this state, etching or sandblasting is applied so that the thickness of the sensor substrate 10 positioned immediately below the IDT electrode 21 becomes thinner than other region. Thereafter, the wafer is dicing-cut, whereby pieces of pressure sensor devices are completed.

The chip size of the pressure sensor device is 10 mm×5 mm×0.3 mm (length×width×thickness) when it is used at a resonance frequency of approximately 300 MHz although the size depends on the resonance frequency of the resonator.

The thickness of the sensor substrate 10 immediately below the IDT electrode 21 is determined based on the relationship between desired sensor sensitivity and the resonance frequency of the surface acoustic wave element 20 for detecting pressure. In detail, the thickness is preferably set in a range of 10 micrometers through 100 micrometers. If the thickness is equal to or less than 10 micrometers, the strength of the sensor substrate 10 lowers, and problems such as cracks from this portion tends to occur. If the thickness is equal to or more than 100 micrometers, its warping amount due to a pressure is reduced and the sensitivity lowers.

Figure 17A:
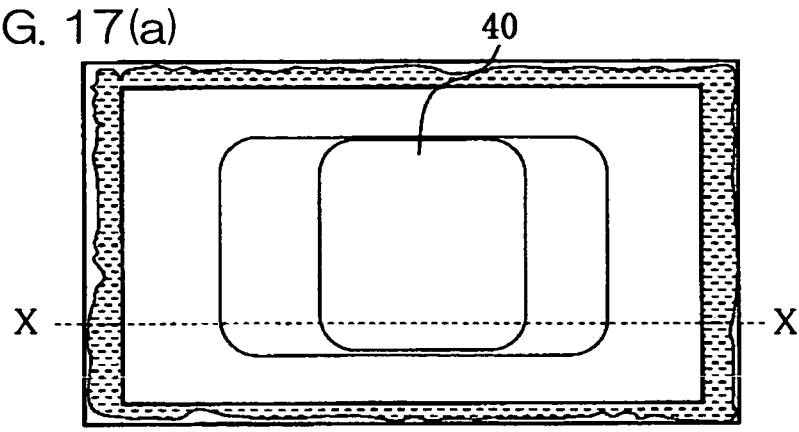
FIG. 17(*a*) is a plan view of the pressure sensor device according to the second embodiment of the invention mounted on a substrate.
Figure 17B:
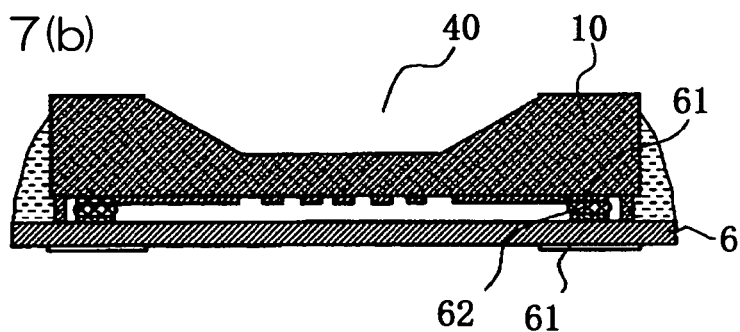
Figure 17C:
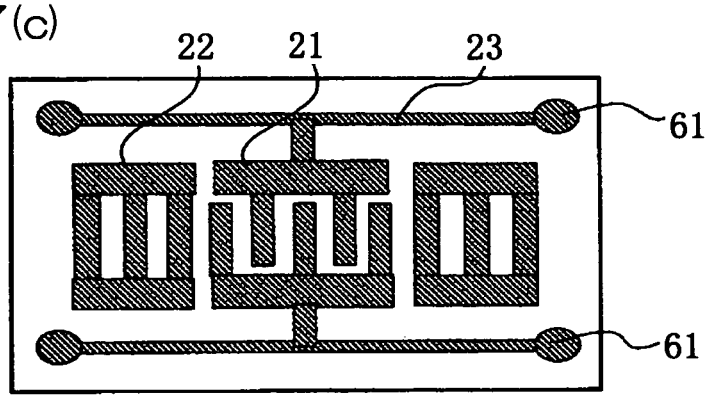
Figure 17D:
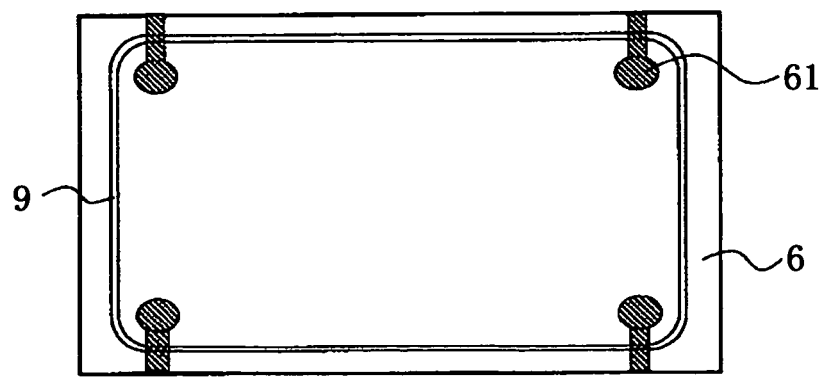

FIG. 17 are drawings of the pressure sensor device of the invention shown in FIG. 16(b) mounted on the supporting substrate 6, and FIG. 17(a) is a top view, FIG. 17(b) is a sectional view on X-X line of FIG. 17(a), FIG. 17(c) is a top view of the pressure sensor device, and FIG. 17(d) is a top view of the supporting substrate 6. In this pressure sensor device, the surface acoustic wave element 30 for reference is not shown.

In FIG. 17, on the tip ends of the pad electrodes 23 connected to the IDT electrode 21, bump electrodes 61 are formed. The bump electrodes 61 are electrically connected to bump electrodes 61 formed on the supporting substrate 60 by solder bumps 62.

A resin hermetically seals the section between the sensor substrate 10 and the supporting substrate 6. A dam to prevent flowing-in of the resin is formed between the solder bumps 62 and the resin. The section between the sensor substrate 10 and the supporting substrate 6 is held at the atmospheric pressure and hermetically sealed.

Next, operations and actual pressure measuring method of the surface acoustic wave element 20 for detecting pressure of FIG. 17 will be described.

Figure 18:
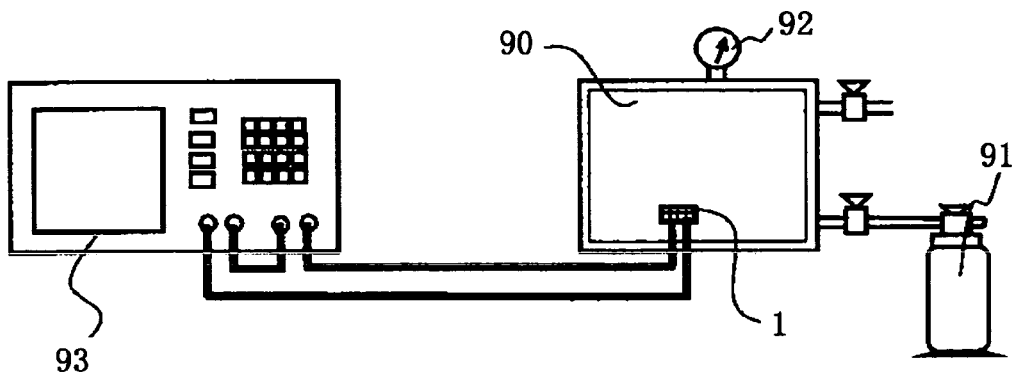
FIG. 18 is a drawing showing a pressure measuring system of the same pressure sensor device.

FIG. 18 is a schematic view of an actual pressure measuring system. In this figure, the pressure sensor device is pressurized by nitrogen injected from a nitrogen cylinder 91 inside a gas chamber 90. Then, a resonance frequency of the surface acoustic wave element 20 for detecting pressure is measured with a network analyzer 93 while checking a pressure rise with a pressure gauge 92.

Figure 19:
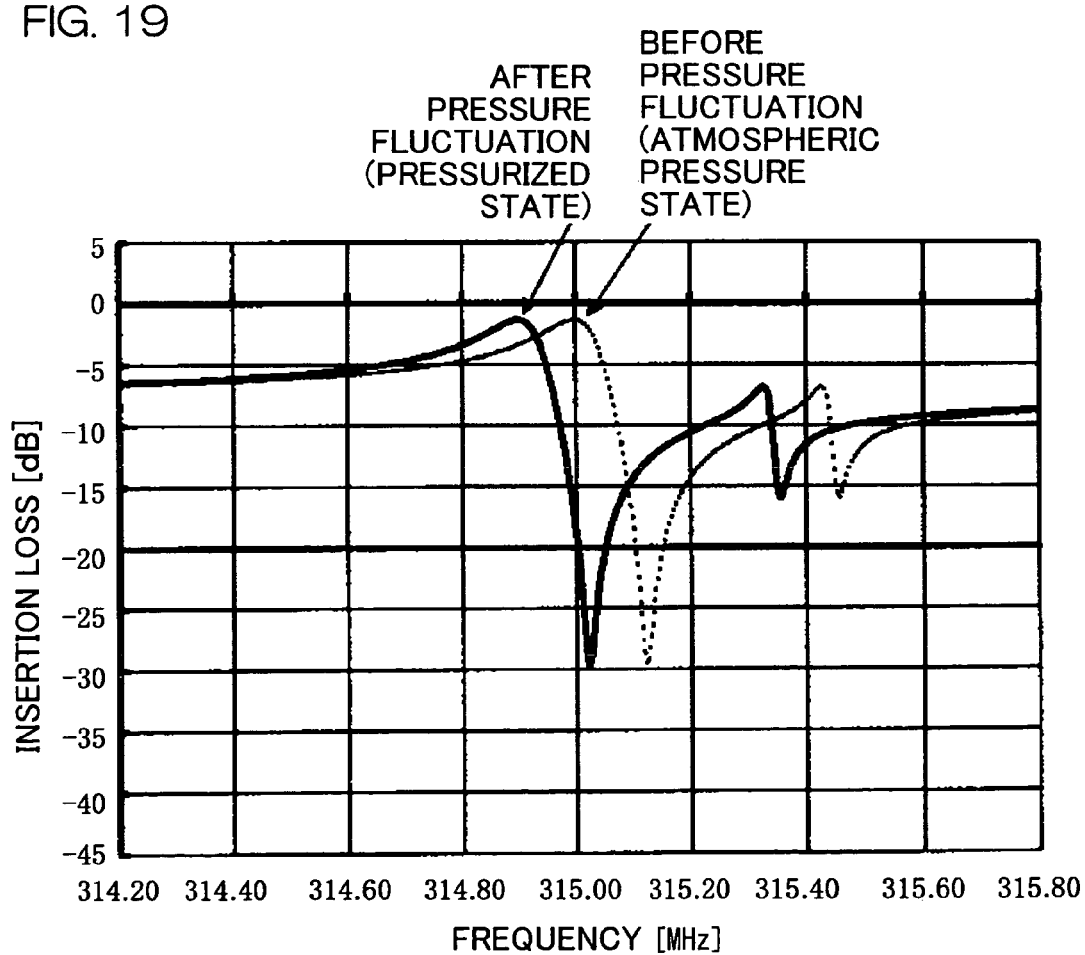
FIG. 19 is a graph showing the results of measurement of resonance characteristics of surface acoustic wave elements used in the pressure sensor device of the type shown in FIG. 16(*b*)

In the pressure sensor device of FIG. 17, resonance characteristics before pressure fluctuation (atmospheric pressure state) and after pressure fluctuation (pressurized state) are shown in FIG. 19. The vertical axis of FIG. 19 shows insertion loss (dB) and the horizontal axis shows frequency (MHz).

In this experiment, as a resonator, a surface acoustic wave resonator (resonance frequency: 315.0 MHz) for RKE (Remote Keyless Entry Security) was used.

Herein, the resonance characteristics shown by the dotted line in FIG. 19 are before pressure fluctuation (atmospheric pressure state), and the resonance characteristics shown by the solid line are after pressure fluctuation (pressurized state).

As understood from FIG. 19, when comparing the resonance characteristics before and after the pressure fluctuation, the resonance characteristics after the pressure fluctuation (pressurized state) shift to the lower frequency side. This is because the IDT electrode 21 of the surface acoustic wave element 20 for detecting pressure is deformed into a convex shape due to the pressure fluctuation. Namely, the wavelength determined by the pitch of the IDT electrode 21 became larger due to deformation of the IDT electrode 21, and the resonance frequency reciprocal to the wavelength shifted to the lower frequency side.

Herein, by calculating the relationship between the resonance frequency change and the pressure in advance, the pressure can be calculated by measuring and converting the resonance frequency change.

Herein, the pressure sensor device of the invention is advantageous in that insertion loss of the resonance frequency does not deteriorate with the resonance characteristics after pressure fluctuation (pressurized state) of the surface acoustic wave element 20 for detecting pressure shown by the solid line in FIG. 19.

Figure 20:
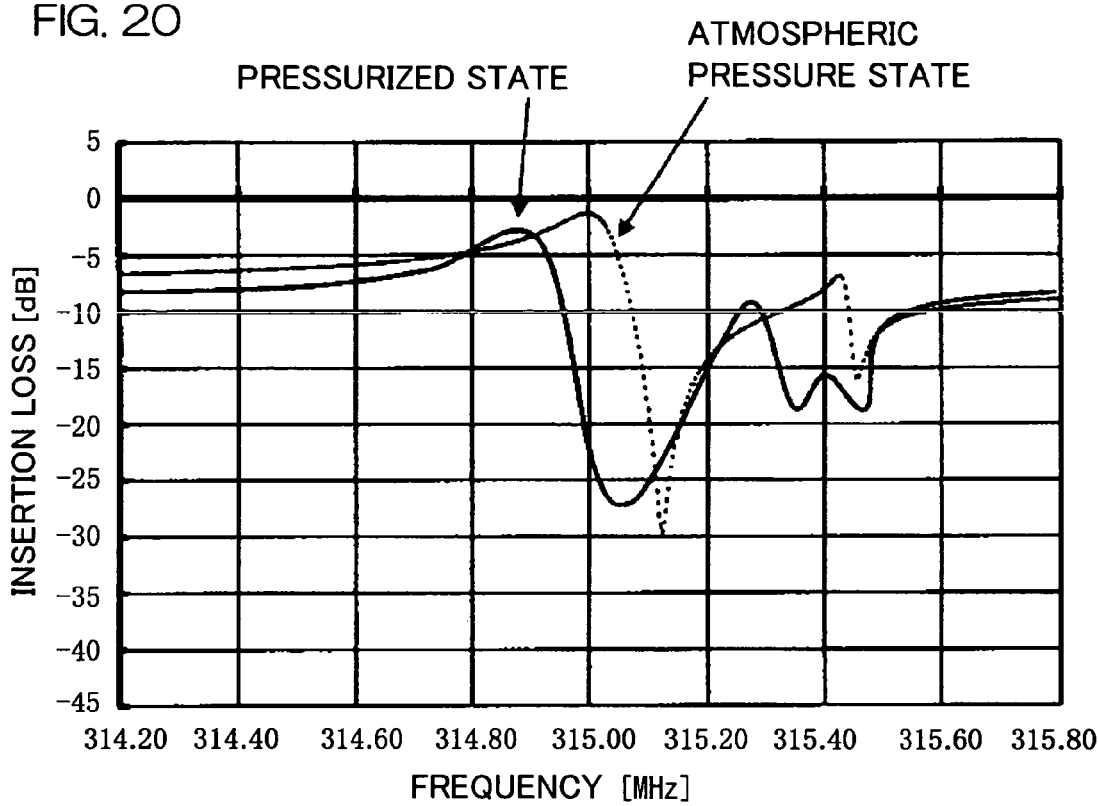
FIG. 20 is a graph showing the results of measurement of resonance characteristics of surface acoustic wave elements used in the pressure sensor device of the type shown in FIG. 16(*c*)

Next, resonance characteristics before pressure fluctuation (atmospheric pressure state) and after fluctuation (pressurized state) of a pressure sensor device structured (FIG. 16(c)) so that the thickness of the sensor substrate 10 changes stepwise between the portions immediately below the reflectors 22 and other portion, are shown in FIG. 20.

The resonance characteristics shown by the dotted line of FIG. 20 are before the pressure fluctuation (atmospheric pressure state), and the resonance characteristics shown by the solid line are after the pressure fluctuation (pressurized state). As shown in FIG. 20, comparing the resonance characteristics before and after the pressure fluctuation, in the resonance characteristics after the pressure fluctuation (pressurized state), the resonance frequency shifted to the lower frequency side. This is because the IDT electrode 21 of the surface acoustic wave element 20 for detecting pressure deformed into a convex shape due to pressure fluctuation. Namely, the wavelength to be determined by the pitch of the IDT electrode 21 increased due to the deformation of the IDT electrode 21, and the resonance frequency reciprocal to the wavelength shifted to the lower frequency side.

Therefore, by calculating the relationship between the resonance frequency change and the pressure in advance, the pressure can be calculated by measuring and converting the resonance frequency change.

The pressure sensor of the invention is advantageous in that the resonance frequency change before and after the pressure fluctuation is great as shown in FIG. 20.

As understood from the results of the experiment, in the pressure sensor device of the invention, the thickness of the sensor substrate 10 positioned immediately below the IDT electrode 21 of the surface acoustic wave element 20 for detecting pressure is made thinner than the thickness of the sensor substrate 10 positioned immediately below the reflector 20, so that the warping amount of the sensor substrate 10 positioned immediately below the IDT electrode 21 according to pressure fluctuation can be increased and the resonance frequency change before and after the pressure fluctuation can be increased, whereby a pressure sensor with high sensitivity is obtained.

Particularly, by increasing the thickness of the sensor substrate 10 gradually with distance from the IDT electrode 21, the reflectors 22 on both sides of the IDT electrode 21 follow the deformation of the IDT electrode according to the pressure fluctuation, so that reflection efficiency of the reflectors 22 is not lowered by the pressure fluctuation, and resonance characteristics that bring about a great effect of energy confinement of surface acoustic waves within the surface acoustic wave element 20 for detecting pressure with smaller loss can be obtained.

In the above-described embodiment, an example in which the invention is applied to a surface acoustic wave resonator having one terminal pair is described, and the invention is also applicable to a resonator or filter that uses a design method using a surface acoustic wave energy confinement effect similar to the invention. The invention is also applicable to a two terminal-pair resonator and a multimode filter.

Third Embodiment

Hereinafter, a pressure sensor device relating to a third embodiment of the invention will be described in detail with reference to the drawings.

Figure 21:
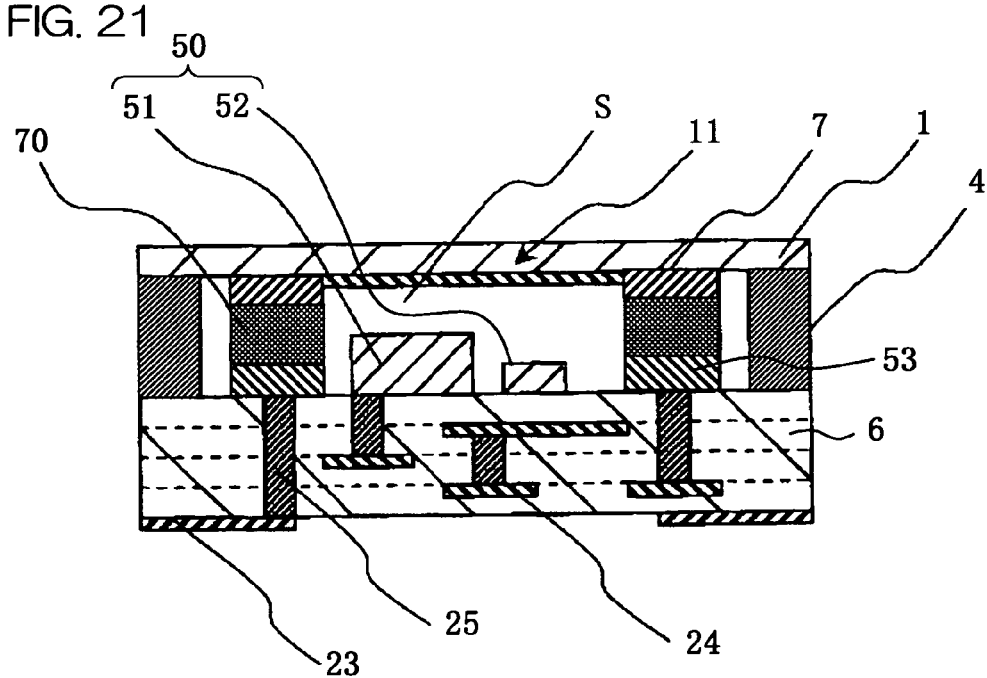
FIG. 21 is a sectional view of a pressure sensor device of a third embodiment of the invention.
Figure 22:
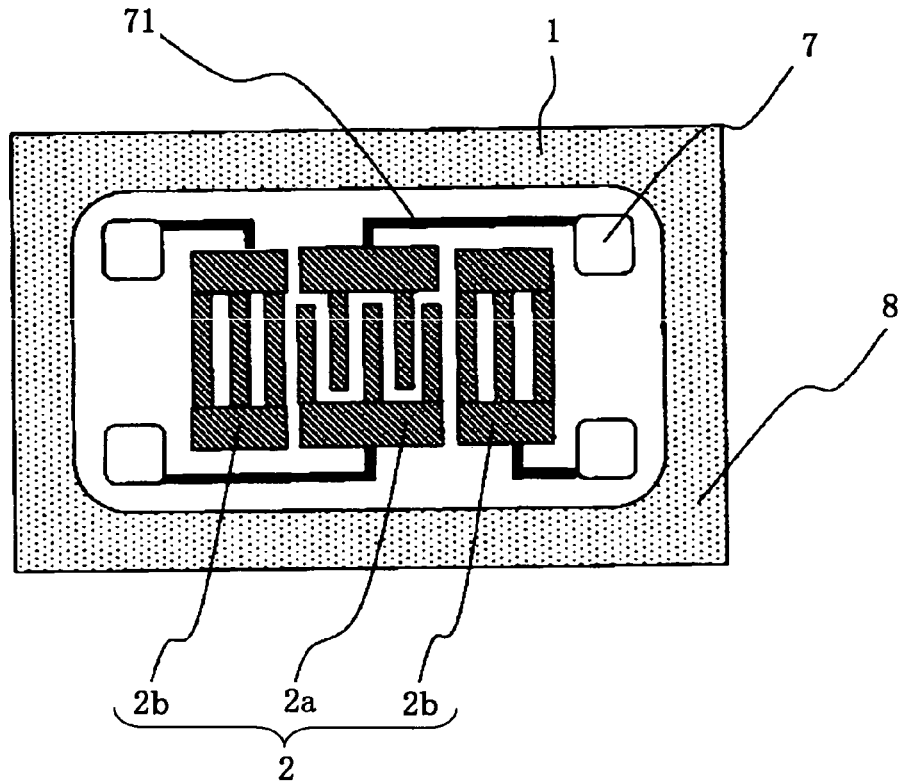
FIG. 22 is a plan view of the lower surface of a sensor substrate 1 used for the same pressure sensor device.
Figure 23:
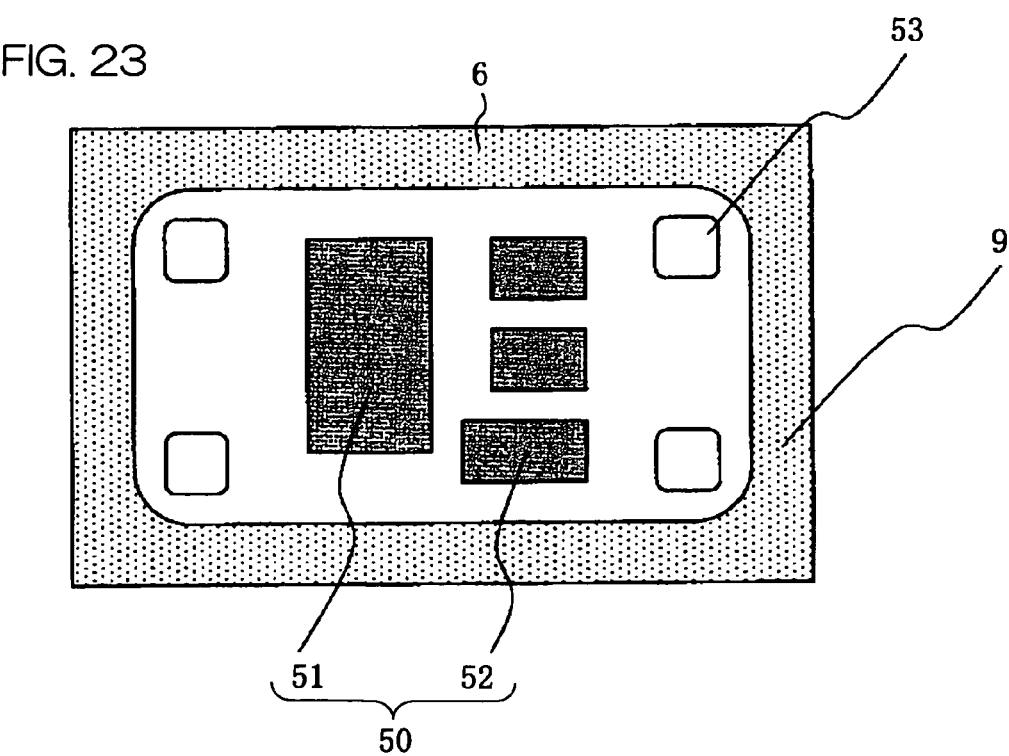
FIG. 23 is a plan view of the upper surface of a supporting substrate 6 used for the same pressure sensor device.

FIG. 21 is a sectional view of the pressure sensor device, FIG. 22 is a plan view showing the lower surface of the sensor substrate 1 to be used for the pressure sensor device, and FIG. 23 is a plan view showing the upper surface of a supporting substrate 6 to be used for the pressure sensor device.

Figure 24:
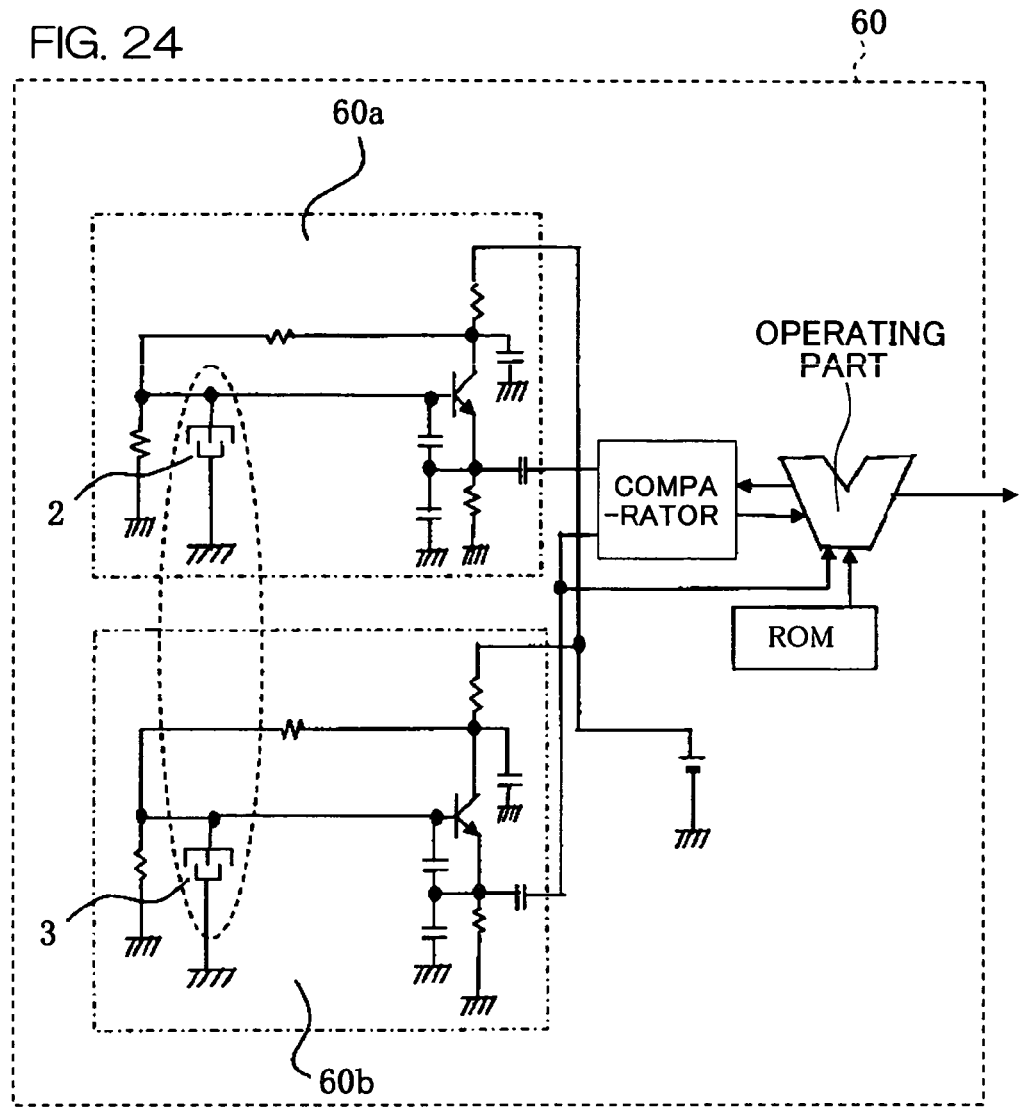
FIG. 24 is a circuit diagram showing an electrical construction example of oscillating circuits and a difference generating circuit of the same pressure sensor device.

FIG. 24 is a circuit diagram showing an electrical construction of oscillating circuits and a difference generating circuit of the pressure sensor device.

The pressure sensor device mainly comprises the sensor substrate 1, the supporting substrate 6, an electronic part element 50, and a sealing member 4.

In the sensor substrate 1, the sensor section 11 deforms according to a pressure applied to the sensor substrate 1 to detect pressure fluctuation.

On the lower surface of the sensor substrate 1, the sensor section 11, electrode pads 7, and draw-out electrodes 71 connecting the sensor section 11 and the electrode pads 7 are formed. Around the sensor section 11, the electrode pads 7, and the draw-out electrodes 71, a junction 8 is provided so as to surround these, and to this junction 8, the sealing member 4 is joined.

As a material of the sensor substrate 1, a material that can be integrally formed with the sensor section 11 and comparatively easily deforms when it receives an external pressure is preferable, and for example, a piezoelectric material such as crystal, lithium niobate, or lithium tantalate is preferably used.

The sensor section 11 is constructed of a surface acoustic wave resonator 2 including IDT electrodes 2a and a pair of reflector electrodes 2b formed on both sides in the surface acoustic wave propagation direction of the IDT electrodes 2a.

The IDT electrodes 2a are connected to the electrode pads 7 via the draw-out electrodes 71.

The IDT electrodes 2a and the reflector electrodes 2b are formed with a thickness of approximately 2000 angstroms by pattern forming of a metal material such as aluminum or gold by means of a conventionally known thin film forming technique such as sputtering, vapor deposition or photolithography.

The electrode pads 7 and the draw-out electrodes 71 are also obtained by pattern forming of a metal material such as aluminum or gold by means of a thin film forming technique or photolithography similar to the aforementioned IDT electrode 2a or the like. It is preferable that the electrode pads 7 are formed to be thick in film thickness to improve its adhesion strength to the base. Furthermore, Cr, Ni, or Au plating is applied to its surface to increase bonding performance to the conductive bonding members 70.

On the other hand, as characteristics required for the supporting substrate 6, it is important that the supporting substrate has sufficient strength so as not to deform due to an external pressure, and as a material thereof, for example, a multilayer circuit board using a ceramic material such as a glass-ceramic material is used.

On the upper surface of this supporting substrate 6, the electronic part element 50 is mounted, and connecting pads 53 to be connected to the electrode pads 7 via the conductive bonding members 70 are provided. The connecting pads 53 are electrically connected to the electronic part element 50 by a part of an internal wiring pattern 24 formed on the surface or inside the supporting substrate 6. Therefore, the surface acoustic wave element 2 and the electronic part element 50 are thus electrically connected to each other.

Around the electronic part element 50 and the connecting pads 53, a junction 9 is provided so as to face the aforementioned junction 8, and the sealing member 4 is joined to this junction 9. Therefore, at the inner side of the junctions 8 and 9, a sealing space S surrounded by the lower surface of the sensor substrate 1, the upper surface of the supporting substrate 6, and the sealing member 4 can be formed.

Furthermore, on the lower surface of the supporting substrate 6, a plurality of external terminal electrodes 23 are formed, and these external terminal electrodes 23 are connected to a wiring pattern of an external circuit board on which this pressure sensor device is mounted. The external terminal electrodes 23 are electrically connected to the electronic part element 50 and the connecting pads 53, etc., on the upper surface of the supporting substrate 6 via the internal wiring pattern 24 and the via hole conductors 25 of the supporting substrate 6.

The conductive bonding members 70 are made of, for example, solder or conductive paste, and it connects the IDT electrode 2a of the surface acoustic wave element 2 and the electronic part element 50 by connecting the electrode pads 7 of the sensor substrate 1 and the connecting pads 53 of the supporting substrate 6.

The supporting substrate 6 is manufactured by, in detail, laminating and press-fitting a plurality of green sheets on which the connecting pads 53, the external terminal electrodes 23, the internal wiring pattern 24, and conductor paste to become the via hole conductors 25 are printed and applied, and integrally firing these.

Preferably, to the surfaces of the connecting pads 53 and the external terminal electrodes 23, plating of Cr, Ni, Sn, Au or the like is applied as appropriate. Thereby, the bonding performance of the connecting pads 53 and the external terminal electrodes 23 can be made excellent.

The sealing member 4 to be interposed between the sensor substrate 1 and the supporting substrate 6 is made of, for example, a resin or a metal material, and surrounds the surface acoustic wave element 2 and the electronic part element 50 and joins the junction 8 of the sensor substrate 1 and the junction 9 of the supporting substrate 6. Thereby, within the sealing space S surrounded by the sensor substrate 1, the supporting substrate 6, and the sealing member 4, the IDT electrodes 2a, the reflector electrodes 2b, the electronic part element 50, and so on are hermetically sealed. Then, this sealing space S is filled with an inert gas such as a nitrogen gas or argon gas, where by oxidation corrosion of the IDT electrode 2a, the reflector electrodes 2b, the electronic part element 50, and so on disposed within the sealing space S is effectively prevented.

As such a sealing member 4, when a conductor material such as solder is used, conductive sealing electrodes are formed at the portions of the junction 8 and the junction 9 to which the sealing member 4 is joined, so that by electrically connecting the sealing electrodes to the ground terminals (external terminal electrodes 23 to be connected to the terminals of a ground potential of the external circuit board) on the lower surface of the supporting substrate 6, the sealing member 4 is held at the ground potential during use of the pressure sensor device, so that a shielding effect of the sealing member 4 can be expected, and undesirable external noise can be reduced well by the sealing member 4.

When a conductive resin is used as the sealing member 4, a shielding effect is also expected by holding it at the ground potential.

The material and manufacturing method for the sealing electrode formed at the junction 8 are the same as those for the electrode pad 7, and the material and manufacturing method for the sealing electrode formed at the junction 9 are the same as those for the connecting pad 53.

The electronic part element 50 is formed by, for example, an IC chip 51 that integrates oscillating circuits and a difference generating circuit and a power amplifier 52.

FIG. 24 is a detailed circuit diagram of a transmission circuit 60. This transmission circuit 60 includes oscillating circuits 60a and 60b and a difference generating circuit 60c. In this circuit, transistors, resistors, coils, capacitors, and surface acoustic wave elements 2 and 3 are disposed as appropriate according to the conditions of the oscillation frequencies.

First, the oscillating circuit 60a is constructed of the surface acoustic wave element 2, and an oscillation stage including an oscillation transistor, capacitors, and resistors that adjust the oscillation conditions which enable oscillation based on an output signal of the surface acoustic wave element 2.

The oscillating circuit 60b is constructed of the surface acoustic wave element 3, and an oscillation stage including an oscillation transistor, capacitors, and resistors that adjust oscillation conditions which enable oscillation based on an output signal of the surface acoustic wave element 3.

The difference generating circuit 60c integrates, for example, a comparator, operating means, and memory means. An output signal of the surface acoustic wave element 2 obtained from the oscillating circuit 60a and an output signal of the surface acoustic wave element 3 obtained from the oscillating circuit 60b are compared and referred to by a comparator and the data is operated by the operating part to prepare a pressure detection signal.

Furthermore, the operating part also performs a function of synthesizing the pressure detection signal into carrier waves to be radio transmitted to the outside and preparing a high frequency signal.

In the difference generating circuit 60c, the output signal of the surface acoustic wave element 2 for detecting and the output signal of the surface acoustic wave element 3 for reference are compared by using a comparator, however, it is also allowed that a pressure detection signal is extracted by using a mixer and a band pass filter based on the two output signals of the surface acoustic wave element 2 for detecting and the surface acoustic wave element 3 for reference.

In the above-described circuit, carrier waves for radio transmission are prepared based on the surface acoustic wave element 3 for reference on the reference side for pressure detection, however, other than the oscillating circuit including the surface acoustic wave element 3 for reference, a carrier wave preparing oscillating circuit can be separately provided.

Figure 25:
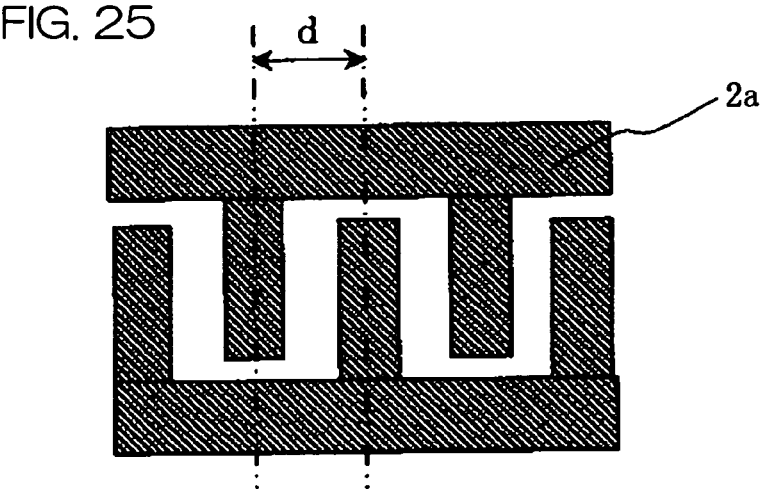
FIG. 25 is a schematic view for describing intervals of electrode fingers of an IDT electrode of a surface acoustic wave element.

In the pressure sensor device of this embodiment constructed as described above, the sensor section 11, that is, the surface acoustic wave element 2 deforms according to an external pressure applied from the outside to the sensor substrate 1. As a result, the elastic constant of the piezoelectric material at the deformed portion changes and the surface acoustic wave propagation speed changes, and in the IDT electrode 2a of the surface acoustic wave element 2, the electrode finger interval d shown in FIG. 25 changes, and due to these actions, the resonance frequency of the surface acoustic wave element 2 changes. Thereby, the oscillation frequencies of the oscillating circuits 60a and 60b also change, so that the pressure fluctuation applied to the sensor substrate 1 is finally detected as a change in oscillation frequency.

Herein, in the pressure sensor device of this embodiment, as described above, the sensor section 11 and the electronic part element 50 are disposed within the sealing space S surrounded by the sensor substrate 1, the supporting substrate 6 and the sealing member 4, so that they are rarely influenced by the external environment, whereby reliability is improved.

It is not necessary to separately secure a space for mounting the electronic part element 50 outside the sealing space S, so that the entire structure of the pressure sensor device can be downsized, and this contributes to high-density mounting and cost reduction.

Next, an example of the pressure sensor device to which an antenna element is added will be described with reference to FIG. 26.

In the pressure sensor device shown in this figure, an antenna element 81 is mounted on the supporting substrate 6. The antenna element 81 is mounted on the supporting substrate 6 by soldering or the like.

By this antenna element 81, a high frequency signal with a predetermined frequency outputted from the transmission circuit 60 can be radio transmitted to another receiving equipment.

As the antenna element 81, for example, a surface-mounting type chip antenna using a dielectric ceramic is used.

The antenna element 81 is connected to the output terminal 62 of the transmission circuit 60 shown in FIG. 24 via a power amplifier 52. When the transmission power is allowed to be small, the antenna element 81 can be directly connected to the output terminal 62 of the transmission circuit 60.

Figure 26:
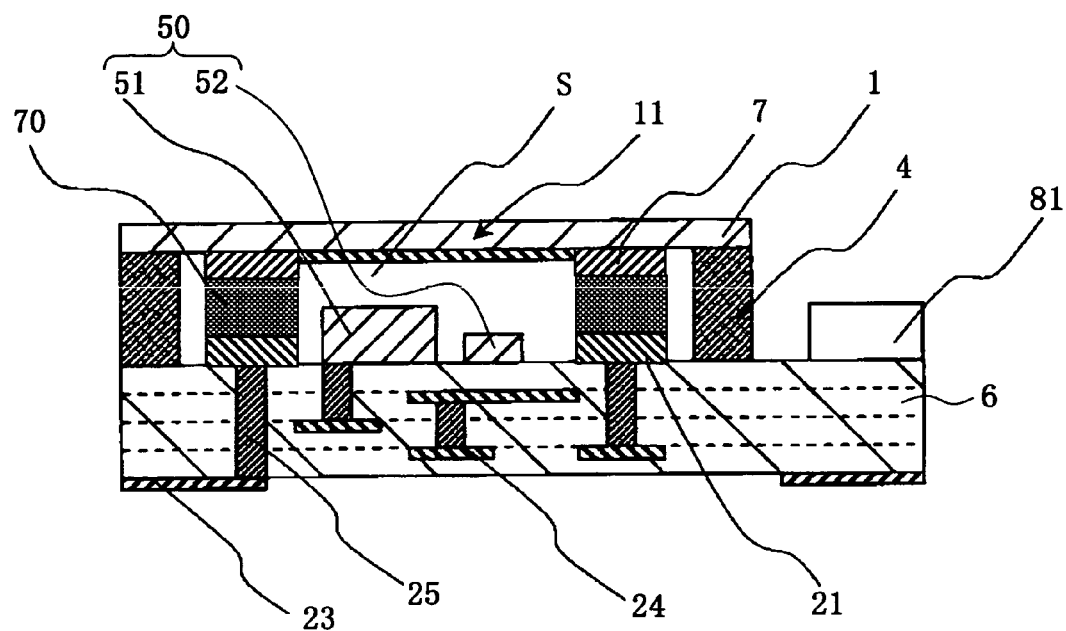
FIG. 26 is a sectional view of a pressure sensor device added with an antenna element.

Preferably, the antenna element 81 is disposed outside the sealing space S made by the sealing member 4 as shown in FIG. 26. Thereby, radio wave interference between the antenna element 81 and the surface acoustic wave element 2 and the electronic part element 50 inside the sealing space S can be avoided, and the high frequency signal can be radio transmitted with almost no attenuation.

According to the pressure sensor device 80 of this embodiment described above, by protecting the surface acoustic wave element 2 of the sensor section 11 and the electronic part element 50 of the transmission circuit 60, etc., from the external environment, reliability is improved and the entire structure can be downsized.

Figure 27:
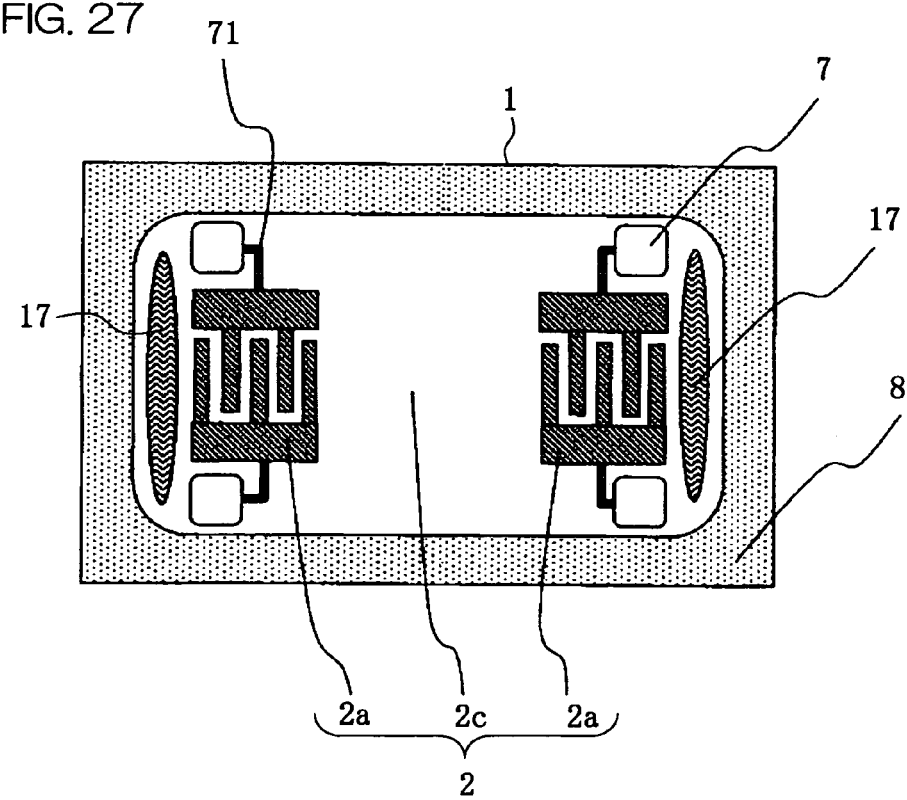
FIG. 27 is a plan view of the lower surface of a sensor substrate 1 on which surface acoustic wave elements of a surface acoustic wave element delay line type are mounted.

Next, a pressure sensor device using a surface acoustic wave delay line as the surface acoustic wave element 2 will be described with reference to FIG. 27. FIG. 27 is a plan view of the lower surface of a sensor substrate 1 to be used for the pressure sensor of this embodiment.

The point of difference of the pressure sensor device of this embodiment from the pressure sensor device of FIG. 21 and FIG. 22 is in that the surface acoustic wave element 2 of the sensor section 11 is constructed of a pair of IDT electrodes 2a disposed on the lower surface of the sensor substrate 1 while spaced from each other, and a surface acoustic wave propagation path 2c between the IDT electrodes.

On the lower surface of the sensor substrate 1, on both sides of the surface acoustic wave element 2, in detail, on both sides in the surface acoustic wave propagation direction, damping members 17 made of a silicon resin or the like that attenuate the surface acoustic waves and prevent the surface acoustic waves from being reflected by the ends of the sensor substrate 1 are formed.

By using such a surface acoustic wave delay line, an oscillating circuit that oscillates at a frequency corresponding to an electrical signal delay time caused by the surface acoustic wave delay line can be constructed.

When an external pressure is applied to the sensor substrate 1 from above and a stress is applied to the surface acoustic wave propagation path 2c of the surface acoustic wave element 2 of the sensor section 11, the propagation path 2c is distorted, and due to an elastic constant change, the surface acoustic wave propagation speed changes, and the length of the surface acoustic wave propagation path 2c changes. By these actions, the electrical signal delay time changes, and accordingly, the surface acoustic wave element 2 and an oscillation frequency of an oscillating circuit connected to the surface acoustic wave element changes. Therefore, the pressure sensor device of this embodiment also serves as a pressure detecting element similar to the aforementioned pressure sensor device.

Figure 28:
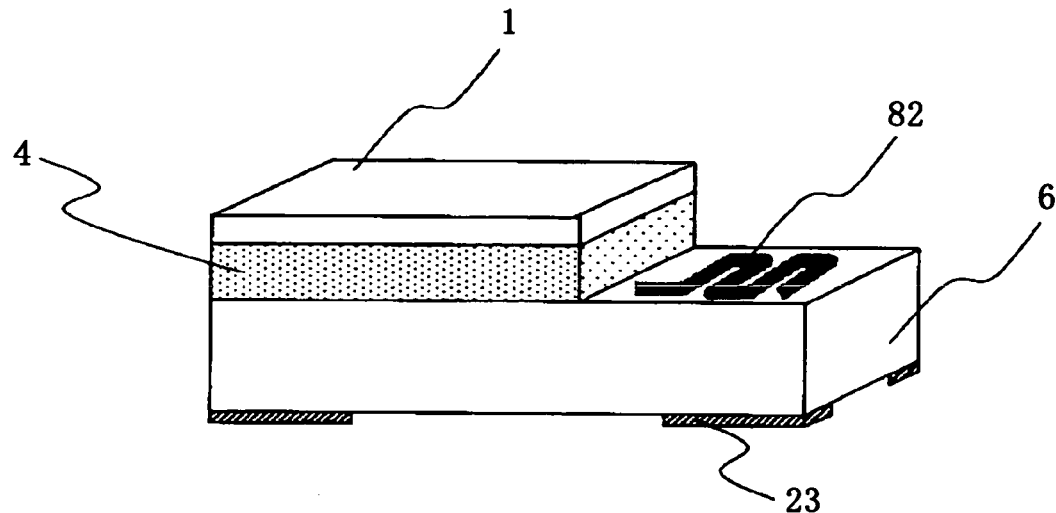
FIG. 28 is a perspective view of a pressure sensor device in which an antenna pattern composed of a meandered conductor pattern is formed on a supporting substrate.

In addition, as shown in FIG. 28, it is also possible that an antenna pattern 82 formed by, for example, a meandered conductor pattern can be formed instead of the antenna element 81. Even in this case using the antenna pattern 82, it is preferable that the antenna pattern 82 is disposed outside the sealing space S formed by the sealing member 4 to prevent attenuation of radio transmission.

In the embodiment of FIG. 26 through FIG. 28, the antenna element 81 and the antenna pattern 82 are disposed on the supporting substrate 6, and as a matter of course, these antennas can be disposed on the sensor substrate 1.

Next, an example in which in the upper surface of the supporting substrate 6, a cavity having a concave section is formed according to the size of the electronic part element 50, and the electronic part element 50 is mounted so that a part or the entirety of the electronic part element 50 is embedded in the cavity, will be described.

Figure 29:
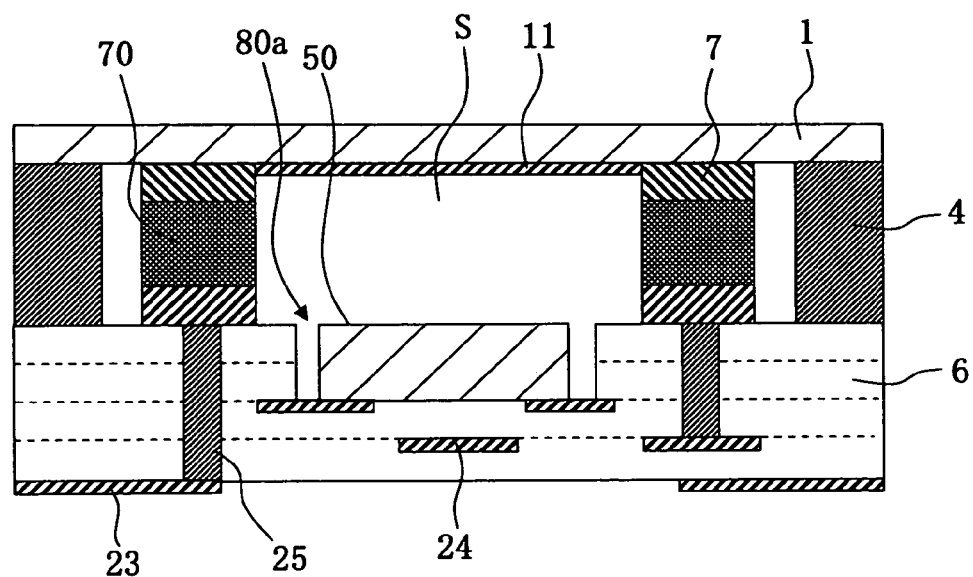
FIG. 29 is a sectional view of a pressure sensor device in which an electronic part element is installed in a concave portion of a supporting substrate.

FIG. 29 is a sectional view of an embodiment in which a concave portion 80a is formed in the supporting substrate 6 and the electronic part element 50 is installed in the concave portion 80a.

According to this embodiment, the concave portion 80a in which the electronic part element 50 is embedded is provided in the upper surface of the supporting substrate 6, and the electronic part element 50 is installed in the concave portion 80a.

According to this structure, even when the electronic part element 50 is a tall part, it is embedded in the concave portion 80a of the supporting substrate 6, so that when mounting the sensor substrate 1 on the supporting substrate 6, the distance between the sensor substrate 1 and the supporting substrate 6 can be freely set without considering the thicknesses of the electronic part element 50 and the degree of freedom in design of the pressure sensor 1 can be increased. In addition, the assembly workability is improved and the productivity of the pressure sensor 1 can be maintained at a high level.

Furthermore, the electronic part element 50 is also hermetically sealed within the sealing space S in which the sensor section 11 is sealed, so that the electronic part element 50 is protected well.

Furthermore, by disposing the sensor section 11 and the electronic part element 50 close to each other, wiring that connects these can be shortened and influence of electromagnetic noise is minimized, and erroneous operations and lowering in measuring accuracy can be effectively prevented. In addition, the mounting surface (bottom surface of the concave portion 80a) of the electronic part element 50 is hardly deformed by external pressure fluctuation, and the electronic part element 50 can be mounted in a very stable state.

In the above-described embodiment, the concave portion 80a in which the electronic part element 50 is embedded is formed in the upper surface of the supporting substrate 6, however, instead of this, it is also allowed that the concave portion 80a in which the electronic part element 50 is embedded is formed in the lower surface of the supporting substrate 6.

Furthermore, in the above-described embodiment, the electronic part element 50 is completely embedded in the concave portion 80a, however, instead of this, it is also possible that the electronic part element 50 is partially embedded in the concave portion 80a so that a part of the electronic part element projects from the opening of the concave portion 80a.

Next, a pressure sensor device formed by adding an acceleration sensor to the pressure sensor device described above will be described in detail with reference to the drawings.

Figure 30:
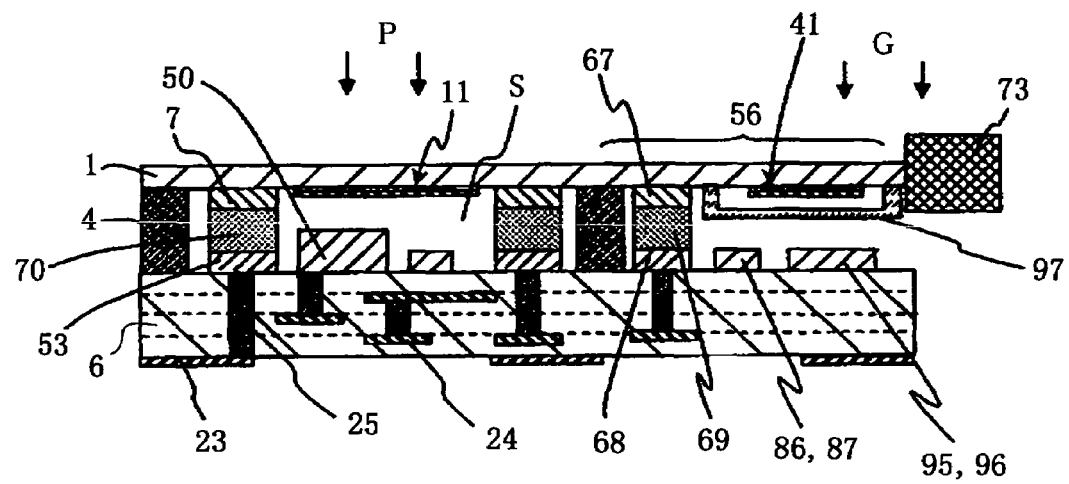
FIG. 30 is a sectional view of a pressure sensor device with an acceleration sensor.

FIG. 30 is a sectional view of a pressure sensor device with an acceleration sensor.

The pressure sensor device with an acceleration sensor shown in the figure is mainly constructed of a supporting substrate 6 on which an electronic part element 50 is mounted, a sensor substrate 1 on which a sensor section 11 and an acceleration detecting element 41 are mounted, a sealing member 4, and so on.

In this pressure sensor device with an acceleration sensor, one end side 56 of the sensor substrate 1 is extended further outward than a pressure detecting region, and on the lower surface of this extended portion 56, the acceleration detecting element 41 is formed.

According to this acceleration detecting element 41, the acceleration detecting element 41 deforms due to application of acceleration G, whereby detecting the acceleration.

The acceleration detecting element 41 can be constructed of an IDT electrode 2a and a pair of reflectors formed on both sides of a surface acoustic wave propagation direction similar to the surface acoustic wave element 2 for detecting pressure.

Figure 31:
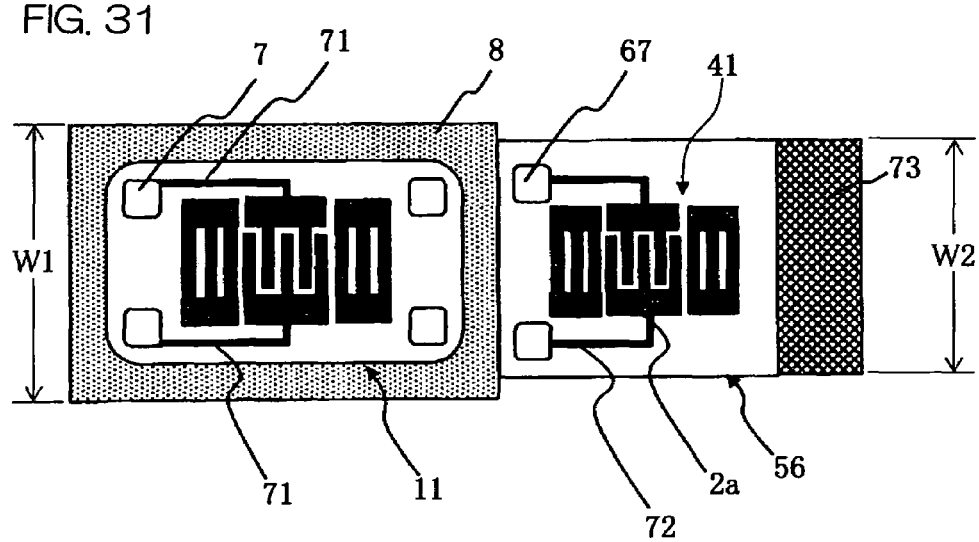
FIG. 31 is a plan view of the lower surface of a sensor substrate 1 on which an acceleration detecting element having a structure of a surface acoustic wave resonator is mounted.

FIG. 31 is a plan view of the lower surface of the sensor substrate 1 on which the acceleration detecting element 41 having a structure of a surface acoustic wave resonator is mounted.

The IDT electrode 2a is connected to the electrode pad 67 via the draw-out electrode 72 as shown in FIG. 30 and FIG. 31. The electrode pad 67 is electrically connected to the connecting pad 68 on the supporting substrate 6 via the conductive bonding member 69. The electrode pads 67 and the draw-out electrodes 72 are obtained by pattern forming of a metal material such as aluminum or gold by means of a thin film forming technique or photolithography similar to the electrode pads 7 and the draw-out electrodes 71 formed around the surface acoustic wave element 2 for detecting pressure described above.

In addition, by forming a weight 73 on the tip end of the acceleration detecting element 41, the acceleration G detecting sensitivity can be improved. The weight 73 is formed by bonding a plate or laminate made of, for example, a metal or ceramic to the end of the extended portion 56 by an adhesive.

When the acceleration detecting element 41 is formed of a surface acoustic wave element as described above, it is preferable that a case 97 is provided so as to hermetically seal the surface acoustic wave element. Thereby, oxidation corrosion of the IDT electrode 2a is prevented.

The width w2 of the shorter side of the extended portion 56 can be arbitrarily set. By setting the width w2 of the shorter side of the extended portion 56 narrower than the width w1 of the portion of the sensor substrate 1 where the surface acoustic wave element 2 for detecting pressure is formed, the extended portion 56 becomes easier to warp according to application of acceleration, and the acceleration detecting sensitivity can be advantageously improved. In addition, by setting the width w2 of the shorter side of the extended portion 56 and the width w1 of the portion of the sensor substrate 1 where the surface acoustic wave element 2 for detecting pressure is formed equal to each other, the process of grinding the sensor substrate 1 to form the extended portion 56 can be omitted, whereby the manufacturing processes of the pressure sensor device 1 can be advantageously simplified.

As described above, at least one end side of the sensor substrate 1 is extended outward while spaced from the upper surface of the supporting substrate 6, and the acceleration detecting element 41 is formed at the extended portion 56, so that it is not necessary to separately prepare a substrate for the acceleration detecting element 41, the number of parts can be reduced, and the pressure sensor device can be reduced in size and weight.

In addition, the surface acoustic wave element 2 for detecting pressure and the acceleration detecting element 41 can be formed by the same manufacturing process, and this contributes to improvement in productivity of the pressure sensor device.

Figure 32:
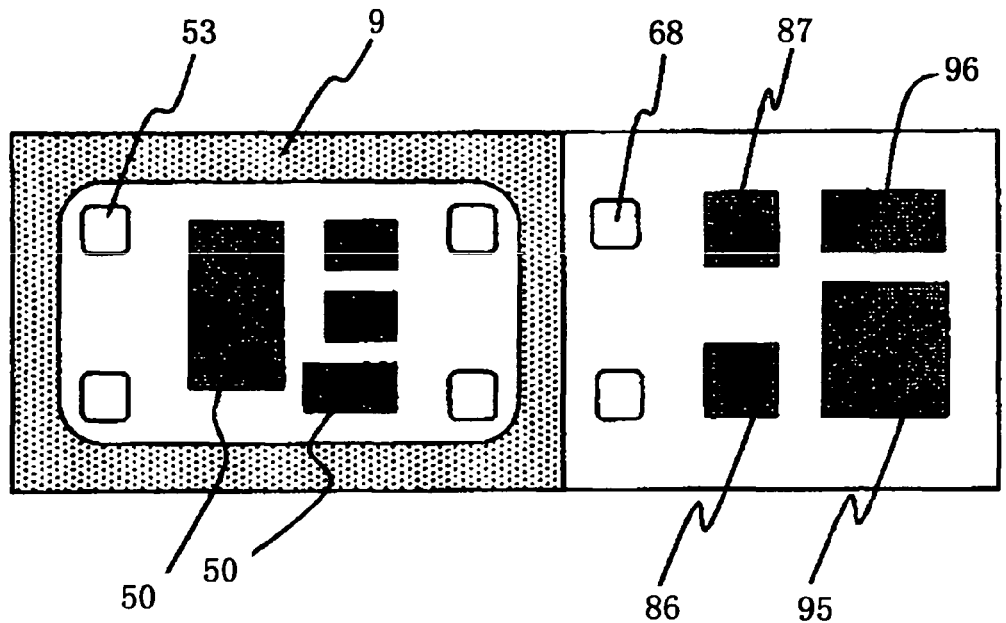
FIG. 32 is a plan view of the upper surface of a supporting substrate 6 of the same pressure sensor device with an acceleration sensor.

FIG. 32 is a plan view of the upper surface of the supporting substrate 6 of this pressure sensor device with an acceleration sensor.

On the supporting substrate 6, at a portion out of the portion where the frame-shaped junction 9 is constructed, circuit elements of an acceleration detecting circuit 86, a power supply control circuit 87, and a power amplifier 96, described later, and an antenna element 95 are mounted.

Figure 33:
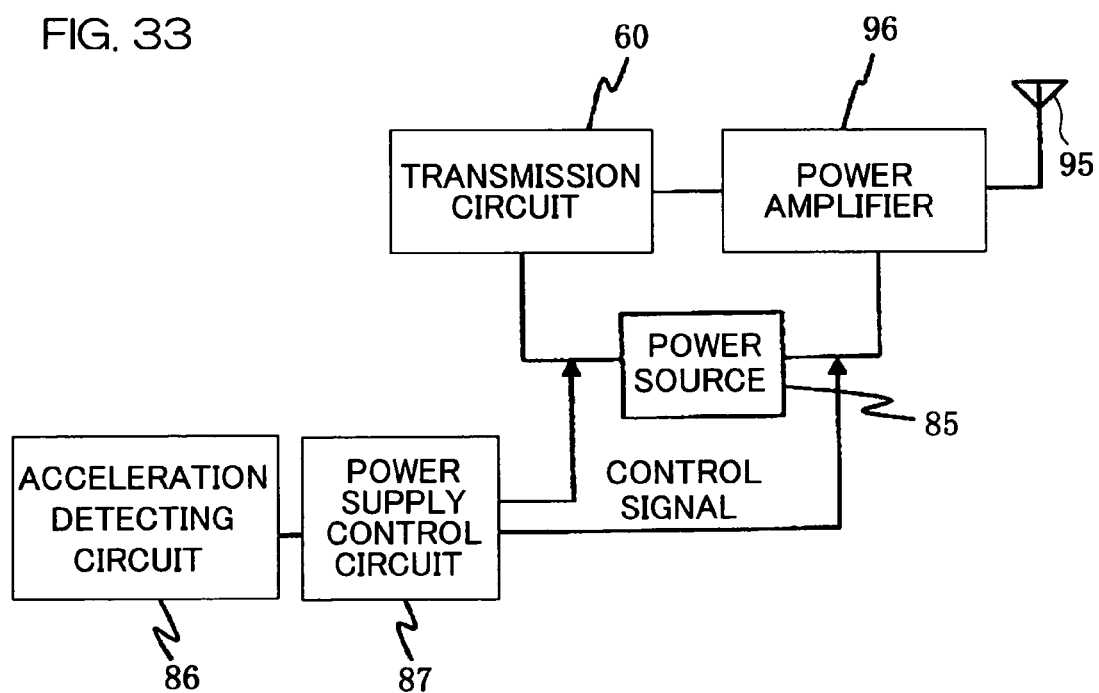
FIG. 33 is a block diagram showing circuitry of the same pressure sensor device with an acceleration sensor.

FIG. 33 is a circuit block diagram showing mutual connection among a transmission circuit 60, an acceleration detecting circuit 86 including the acceleration detecting element 41, a power supply control circuit 87, a power amplifier 96, and the antenna element 95, etc.

The transmission circuit 60 includes, for example, active parts such as ICs and transistors and passive parts such as resistors and capacitors, and is electrically connected to the surface acoustic wave element 2 to transmit an electrical signal with a predetermined frequency. The transmission circuit 60 is connected to the power amplifier 96, whereby a transmission signal outputted from the transmission circuit 60 can be amplified.

On the other hand, a detection output of the acceleration detecting circuit 86 is supplied to the power supply control circuit 87. Then, the power supply control circuit 87 is connected to the transmission circuit 60 and the power amplifier 96 so that the power supply from a power source 85 to the transmission circuit 80 and the power amplifier 96 is controlled by the power supply control circuit 87.

The antenna element 95 can radio transmit an electrical signal with a predetermined frequency that was outputted from the transmission circuit 60 and amplified by the power amplifier 96 to another receiving equipment. Therefore, receiving equipment that has received radio waves from the antenna element 95 can obtain pressure information even at a site apart from the pressure sensor device. As such an antenna element 95, for example, a surface mounting type chip antenna or the like using a dielectric ceramic is used, and is mounted on the supporting substrate 6 by soldering or the like.

An embodiment in which the antenna element 95 is formed on the upper surface of the sensor substrate 1 will be described later with reference to FIG. 38 and FIG. 39.

Figure 34:
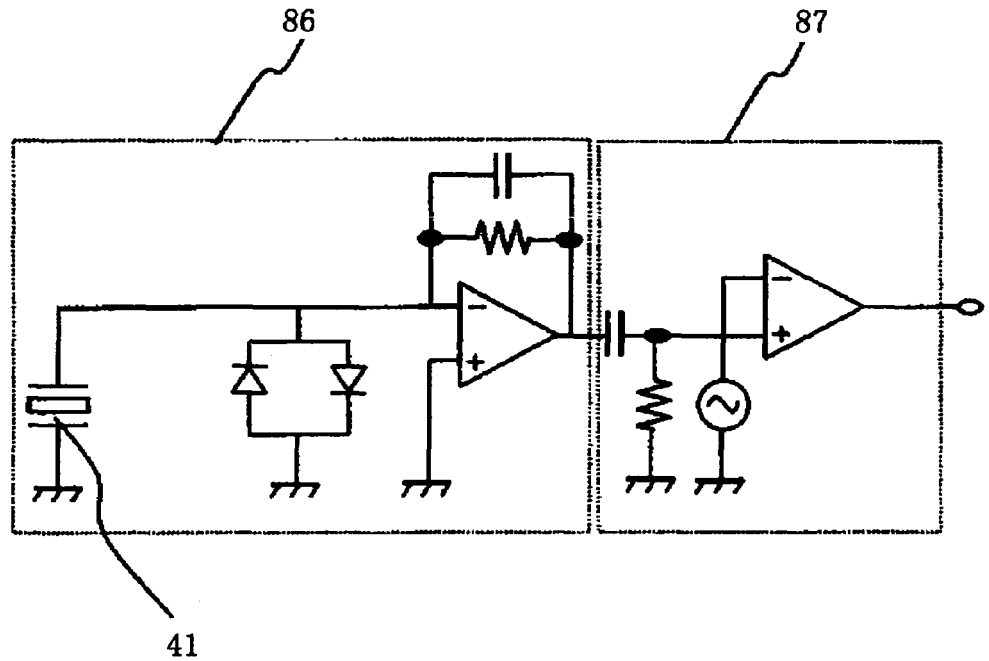
FIG. 34 is a circuit diagram showing detailed circuitry of an acceleration detecting circuit and a power supply control circuit.

FIG. 34 is a circuit diagram showing detailed circuitry of the acceleration detecting circuit 86 and the power supply control circuit 87. The acceleration detecting circuit 86 is constructed, as shown in FIG. 34, the acceleration detecting element 41 and a protector circuit and an operation power amplifier formed of diodes, and the power supply control circuit 87 is constructed of a high pass filter including a capacitor and a resistor, a comparing voltage source, and an operation power amplifier.

Next, operations for detecting acceleration and pressure by using the pressure sensor device with the acceleration sensor described above will be described with reference to the circuit diagrams of FIG. 33 and FIG. 34. Herein, explanation is given by assuming that the pressure sensor device is installed inside a tire of a vehicle.

First, operations for detecting the acceleration will be described. When the vehicle starts running, the number of rotations of the tire increases, and acceleration G is generated according to the rotation. When this acceleration G is applied to the acceleration detecting element 41, a bending moment is applied to the acceleration detecting element 41 due to a force applied to the extended portion 56 and the weight 73, and the acceleration detecting element 41 warps and the acceleration detecting element 41 deforms. As a result, a surface acoustic wave propagation speed changes due to a change in elastic constant at the distorted portion of the sensor substrate 1, and the electrode finger arranging pitch d (shown in FIG. 25) of the IDT electrode 2a of the acceleration detecting element 41 changes, and by these actions, the resonance frequency of the acceleration detecting element 41 changes.

Then, an electromotive force in proportion to the change is generated, and based on this electromotive force, the acceleration is detected by the acceleration detecting circuit 86, and a control signal in proportion to the resonance frequency change or the impedance change is obtained. Then, when this control signal is inputted into the power supply control circuit 87, if the level of the control signal exceeds a threshold according to a predetermined vehicle speed, power is supplied from the power source 85 such as a battery to the transmission circuit 60 and the power amplifier 96, and if the level of the control signal is equal to or lower than the threshold, power is not supplied from the power source 85 to the transmission circuit 60 and the power amplifier 96.

Therefore, only when the vehicle travels at a speed equal to or higher than the predetermined speed, power can be supplied. Thereby, power consumption of the pressure sensor device can be effectively reduced and power consumption of the power amplifier is reduced, and the life of the power source can be lengthened.

The threshold of the control signal can be arbitrarily set by properly selecting circuit elements of the power supply control circuit 87.

It is also possible that the acceleration detecting element 41 formed on the sensor substrate 1 can be formed of a surface acoustic wave delay line constructed of a pair of IDT electrodes disposed while spaced from each other and a surface acoustic wave propagation path between the IDT electrodes.

In the case where the surface acoustic wave delay line is thus used, when acceleration G is applied to the sensor substrate 1, due to a force applied to the extended portion 56 and the weight 73, a bending moment is applied to the sensor substrate 1 and the acceleration detecting element warps, and the surface acoustic wave element deforms. Thereby, when a stress is applied to and distorts the surface acoustic wave propagation path of the surface acoustic wave element, due to a change in elastic constant at this portion, the surface acoustic wave propagation speed changes, and the length of the surface acoustic wave propagation path changes. Then, according to these actions, the electrical signal delay time changes, whereby the oscillation frequency of the oscillating circuit changes. Therefore, the acceleration detecting element constructed of a surface acoustic wave delay line also functions as an acceleration detecting element similarly to the acceleration detecting element 41 in the aforementioned embodiment.

In the construction of FIG. 30, the acceleration detecting element 41 is formed on only the lower surface of the extended portion 56, however, instead of this, it is also allowed that the acceleration detecting element 41 is formed on both upper and lower surfaces of the extended portion 56. In this case, by calculating a difference in out puts between the two acceleration detecting elements 41 formed on both upper and lower surfaces of the extended portion 56, influence of a temperature change or the like can be corrected, and the measuring accuracy of the acceleration detecting elements 41 can be improved.

Next, a modified example of the pressure sensor device with an acceleration sensor of the invention will be described.

Figure 35:
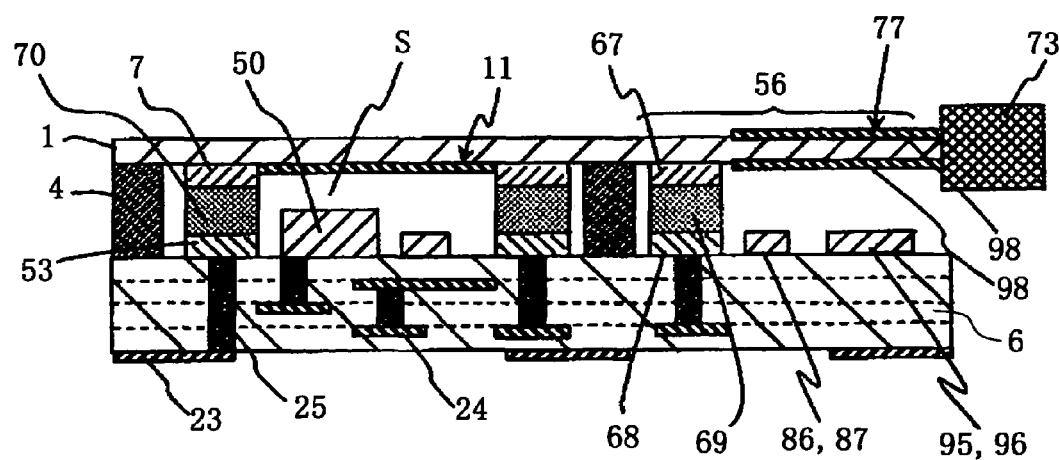
FIG. 35 is a sectional view of a pressure sensor device with an acceleration sensor having another construction.
Figure 36:
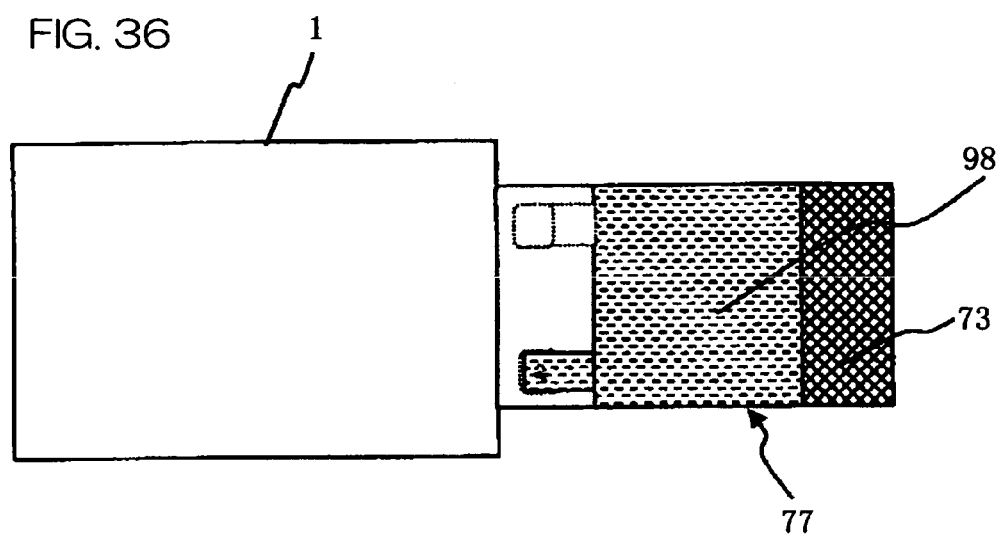
FIG. 36 is a plan view of the upper surface of the sensor substrate 1.
Figure 37:
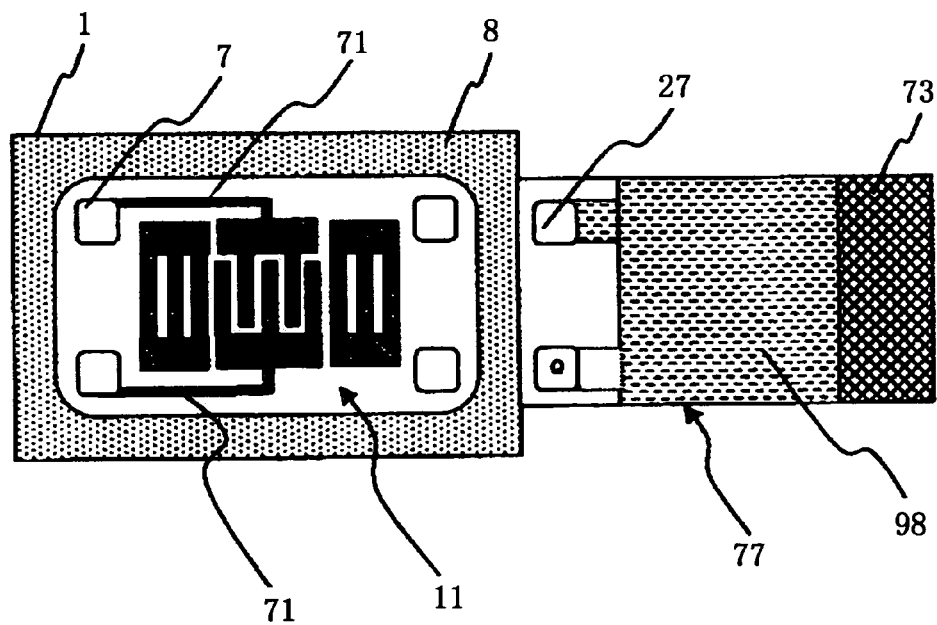
FIG. 37 is a plan view of the lower surface of the sensor substrate 1.

FIG. 35 is a sectional view of a pressure sensor device with an acceleration sensor of the invention, FIG. 36 is a plan view of the upper surface of the sensor substrate 1, and FIG. 37 is a plan view of the lower surface of the sensor substrate 1. For the same parts as those of the pressure sensor device with the acceleration sensor shown in FIG. 30, the same symbols are attached and explanation thereof is omitted.

In the pressure sensor device of FIG. 30, the acceleration detecting element is constructed of a surface acoustic wave resonator formed on one surface of the extended portion 56, however, in the pressure sensor device shown in FIG. 35, instead of this, the acceleration detecting element is constructed by two monomorph elements 77 formed on the respective upper and lower surfaces of the extended portion 56. The monomorph elements 77 use bulk vibrations of the sensor substrate 1, and can be formed by depositing vibration electrodes 98 onto both upper and lower surfaces of the extended portion 56 of the sensor substrate 1.

For the vibration electrodes 98, a metal material such as silver is used, and the vibration electrodes are formed by a film forming technique such as a conventionally known sputtering and vapor deposition method.

Such a monomorph type acceleration detecting element detects acceleration as follows. First, when acceleration G is applied to the extended portion 56 and the weight 73, the sensor substrate 1 warps and the monomorph element 77 formed at the extended portion 56 deforms. At this point, an electromotive force according to the deformation of the monomorph element is generated, and by using this, the acceleration can be detected.

When the acceleration detecting element is thus constructed by the monomorph elements 77, the pattern form can be formed as a solid pattern, and hermetical sealing is not necessary, so that it can be comparatively easily formed and the productivity of the piezoelectric sensor device 1 is improved.

In FIG. 35, two monomorph elements 77 are deposited on both upper and lower surfaces of the extended portion 56, however, a multilayer structure such as a bimorph element can also be used.

Next, a pressure sensor device to which an antenna pattern is attached will be described in detail with reference to the drawings.

Figure 38:
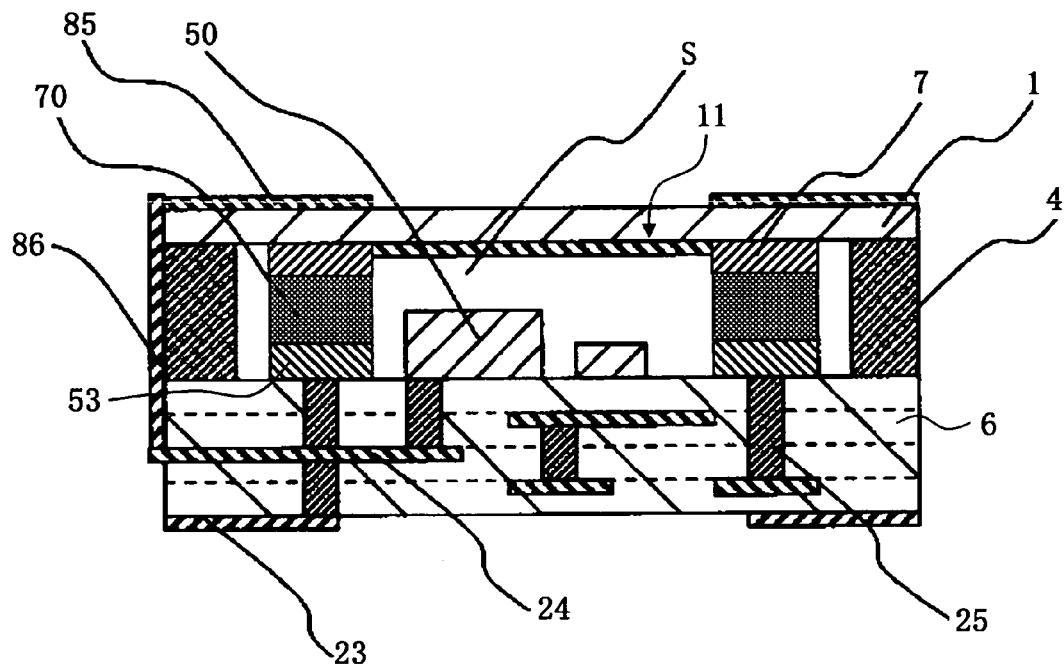
FIG. 38 is a sectional view of a pressure sensor device with an antenna pattern.
Figure 39:
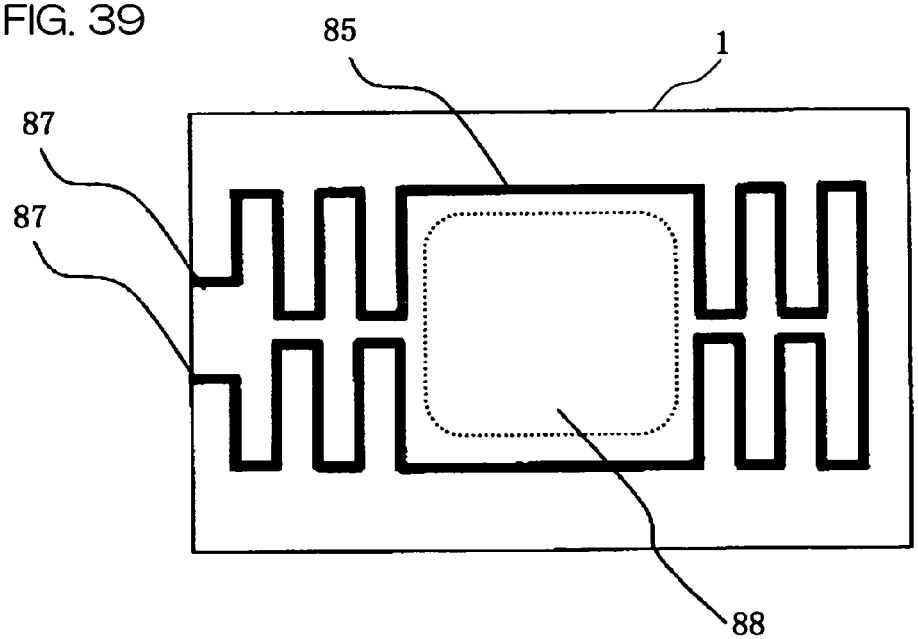
FIG. 39 is a plan view of the upper surface of a sensor substrate used for the same pressure sensor device.
Figure 40:
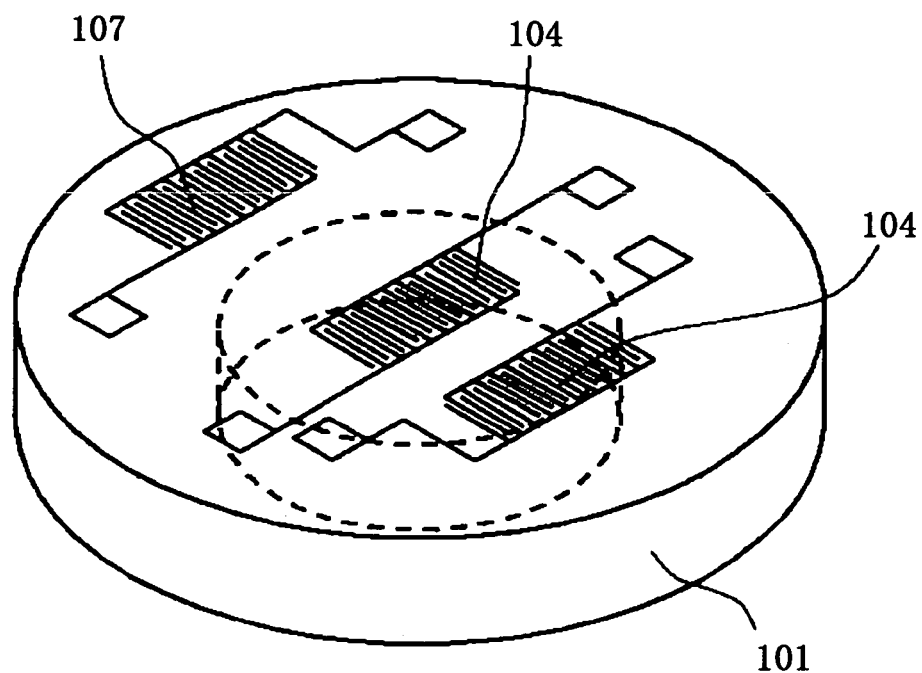
FIG. 40 is an external perspective view of a conventional pressure sensor device.
Figure 41:
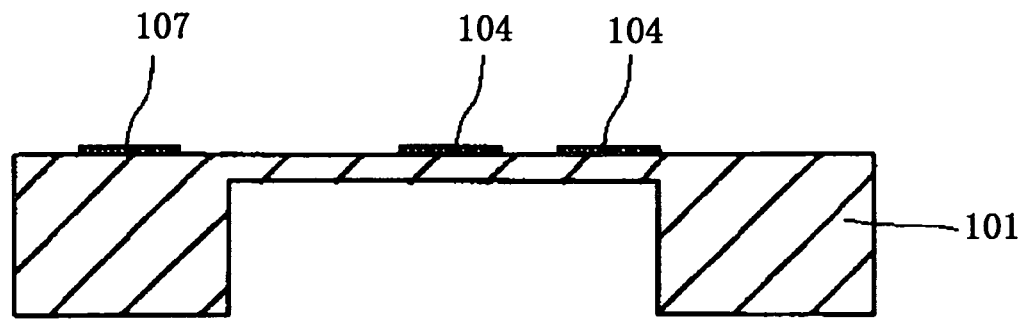
FIG. 41 is a sectional view of the conventional pressure sensor device.

FIG. 38 is a sectional view of a pressure sensor device having an antenna pattern, and FIG. 39 is a plan view of the upper surface of a sensor substrate to be used for the pressure sensor device.

In this embodiment, only a difference from the aforementioned embodiment of FIG. 26 and FIG. 28 is described, and the same reference numerals are used for the same components and overlapping explanation thereof is omitted.

The pressure sensor device of this embodiment is different from the pressure sensor device of FIG. 26 and FIG. 28 in that the pressure sensor device of this embodiment has an antenna pattern 85 on the upper surface of the sensor substrate 1.

This antenna pattern 85 is for radio transmitting an electrical signal with a predetermined frequency outputted from the transmission circuit 60 to another receiving equipment via the power amplifier 96.

This antenna pattern 85 is formed in a meandered form in a region except for the region 88 immediately above the sensor section 11 on the upper surface of the sensor substrate 1 as shown in FIG. 39.

The pattern forming of this antenna pattern 85 is performed by thick film printing of a metal material such as aluminum or a copper foil. The pattern line width and film thickness of the antenna pattern 85 used herein are approximately 100 micrometers and 10 micrometers, respectively, and as the pattern length, a length of approximately $\lambda/4$ or $5\lambda/8$ of the wavelength of the frequency to be transmitted is formed by changing the number of times of meandering (length) of the pattern.

The power supply terminals of the antenna pattern 85 are shown by the reference numeral "87". On the side surface of the pressure sensor device, power supply lines 86 extending from the power supply terminals 87 are formed. The power supply lines 86 are connected to one of the internal wiring patterns 24 of the supporting substrate 6 of the pressure sensor device along the side surface of the pressure sensor device.

Between the supporting substrate 6 and the sensor substrate 1, a sealing member 4 is interposed so as to surround the above-described surface acoustic wave element 2 for detecting pressure, the electronic part element 50, the connecting pads 53, and the electrode pads 7. This sealing member 4 can be made of a resin, however, in order to provide a shielding effect to cut undesirable external noise, and at the same time, in order to obtain excellent heat conduction between the surface acoustic wave element 2 for detecting pressure and the surface acoustic wave element 3 for reference, preferably, the sealing member 4 is made of a conductor material such as solder.

However, when a conductor material is used for the sealing member 4, it is necessary that the power supply line 86 formed on the side surface of the pressure sensor device and the sealing member 4 must be insulated from each other. Therefore, an insulating resin or the like is formed on the outer surface of the sealing member 4 to prevent short-circuits between the sealing member 4 and the power supply line 86.

In the pressure sensor device of this embodiment, the electronic part element 50 and the antenna pattern 85 are disposed close to each other, so that the power supply line 86 connecting these can be shortened. Therefore, influence of transmission loss due to the wiring line 86 can be minimized and the electrical signal outputted from the transmission circuit 60 can be transmitted with almost no attenuation. As a result, power consumption of the battery can be reduced.

In addition, the antenna pattern 85 is formed in a meandered form on the upper surface of the sensor substrate 1 except for the region 88 immediately above the sensor section 11, so that it is not necessary to separately prepare a substrate for the antenna, the number of parts can be reduced, and this contributes to downsizing and cost reduction of the pressure sensor device.

In this embodiment, as the antenna pattern 85 on the upper surface of the sensor substrate 1, a meandered loop-type antenna is formed, however, instead of this, a dipole-type antenna element or the like can also be formed.

The invention is not limited to the above-described embodiments, and it can be variously modified and improved within the scope without deviating from the spirit of the invention. For example, in the above-described embodiments, a single crystal piezoelectric material is used for the sensor substrate, however, instead of this, a multicrystal piezoelectric material can also be used.

What is claimed is:
1. A pressure sensor device comprising:
a supporting substrate;
a sensor substrate made of a piezoelectric material, having a lower surface on which a sensor section for detecting pressure is formed;
a concave portion formed on the upper surface of the sensor substrate; and
a sealing member that is joined to an upper surface of the supporting substrate and the lower surface of the sensor substrate and forms a sealing space for sealing the sensor section between the substrates,
the sensor section being provided with a first surface acoustic wave element for detecting pressure by forming an IDT electrode on the lower surface of the sensor substrate within a region where the concave portion is formed at a plan view, and with a second surface acoustic wave element for reference for comparing output signals of the first surface acoustic wave element and the second surface acoustic wave element on the lower surface of the sensor substrate positioned in a region out of the concave portion at a plan view, wherein a frequency band from a resonance frequency to an antiresonance frequency of the first surface acoustic wave element and a frequency band from a resonance frequency to an antiresonance frequency of the second surface acoustic wave element do not overlap each other, and further comprising:

a first oscillating circuit that oscillates at a predetermined frequency based on the resonance frequency of the first surface acoustic wave element or based on delay time of an electrical signal generated by the first surface acoustic wave element;

a second oscillating circuit that oscillates at a predetermined frequency based on the resonance frequency of the second surface acoustic wave element based on delay time of an electrical signal generated by the second surface acoustic wave element;

a difference generating circuit that generates and outputs a conversion signal by comparing an oscillation signal from the first oscillating circuit with an oscillation signal from the second oscillating circuit; and a modulation circuit that modulates the conversion signal from the difference generating circuit and the oscillation signal from the second oscillating circuit and outputs these to the outside.

2. The pressure sensor device according to claim 1, wherein an inert gas fills in the sealing space.

3. The pressure sensor device according to claim 1, wherein electrode pads to be electrically connected to the sensor section are provided within the sealing space on the lower surface of the sensor substrate, and connecting pads to be electrically connected to the electrode pads via conductive bonding members are provided within the sealing space on the upper surface of the supporting substrate.

4. The pressure sensor device according to claim 1, wherein the sealing member is made of a conductor material, and is electrically connected to ground terminals provided on the supporting substrate.

5. The pressure sensor device according to claim 1, wherein the first surface acoustic wave element and the second surface acoustic wave element are arranged in line by interposing a reflector therebetween, and the reflector is shared by the surface acoustic wave elements disposed on both sides of the reflector.

6. The pressure sensor device according to claim 1, wherein a damping member that blocks transmission of surface acoustic waves or lowers the intensities of surface acoustic waves is disposed between the first surface acoustic wave element and the second surface acoustic wave element on the sensor substrate.

7. The pressure sensor device according to claim 1, wherein the first surface acoustic wave element and the second surface acoustic wave element are arranged on the sensor substrate so that the surface acoustic wave propagation directions of the elements are parallel to each other and the elements are placed in a direction orthogonal to the surface acoustic wave propagation directions.

8. The pressure sensor device according to claim 1, wherein an IC chip includes the first oscillating circuit, the second oscillating circuit, the difference generating circuit, and the modulation circuit, and the IC chip and the first surface acoustic wave element and the second surface acoustic wave element are mounted on the same substrate.

9. The pressure sensor device according to claim 5, wherein a thickness of the sensor substrate positioned immediately below the reflector near the IDT electrode is almost equal to that of the region immediately below the IDT electrode, and is gradually increased with distance from the IDT electrode.

10. The pressure sensor device according to claim 9, wherein the thickness of the sensor substrate positioned immediately below the IDT electrode is less than the thickness of the sensor substrate positioned immediately below the reflector.

11. The pressure sensor device according to claim 1, wherein an electronic part element including a part of the oscillating circuits is disposed on the supporting substrate.

12. The pressure sensor device according to claim 11, wherein the electronic part element is mounted on the upper surface of the supporting substrate.

13. The pressure sensor device according to claim 11, wherein a concave portion is formed on the upper surface or lower surface of the supporting substrate within the sealing space, and an electronic part element including the oscillating circuits is embedded in the concave portion.

14. The pressure sensor device according to claim 13, wherein the concave portion is formed on the upper surface of the supporting substrate.

15. The pressure sensor device according to claim 11, wherein one end side of one of the sensor substrate and the supporting substrate is extended to form an extended portion while it is spaced from the other substrate, and at the extended portion, an acceleration detecting element for detecting acceleration is provided.

16. The pressure sensor device according to claim 15, wherein the extended portion is formed on the sensor substrate.

17. The pressure sensor device according to claim 15, comprising:

a transmission circuit that transmits a signal modulated from the conversion signal by the modulation circuit to the outside;

an acceleration detecting circuit that outputs a predetermined electrical signal based on an acceleration detection signal from the acceleration detecting element;

power supply means for supplying power to the transmission circuit; and a power supply control circuit that controls power supply from the power supply means to the transmission circuit, wherein the power supply control circuit controls power supply from the power supply means based on whether the acceleration has exceeded a threshold.

18. The pressure sensor device according to claim 15, wherein the acceleration detecting element is formed of a surface acoustic wave element.

19. The pressure sensor device according to claim 11, wherein an antenna element to be electrically connected to the electronic part element is mounted on the upper surface of the supporting substrate and/or the lower surface of the sensor substrate.

20. The pressure sensor device according to claim 19, wherein the antenna element is mounted outside of the sealing space.

21. The pressure sensor device according to claim 11, wherein an antenna pattern to be electrically connected to the electronic part element is deposited onto the upper surface of the supporting substrate and/or the lower surface of the sensor substrate.

22. The pressure sensor device according to claim 21, wherein the antenna pattern is mounted outside of the sealing space.

23. The pressure sensor device according to claim 11, wherein an antenna pattern to be electrically connected to the electronic part element is deposited onto the upper surface of the sensor substrate.

24. The pressure sensor device according to claim 23, wherein the antenna pattern is formed in a region except for a region immediately above the first surface acoustic wave element.

25. The pressure sensor device according to claim 21, wherein the antenna pattern has a meandered form.

* * * * *